US012810586B2

(12) United States Patent

Singh et al.

(10) Patent No.: US 12,810,586 B2

(45) Date of Patent: Nov. 24, 2026

(54) SHAPE AWARENESS AND INTERPRETABILITY IN DEEP NETWORKS USING GEOMETRIC MOMENTS

(71) Applicants: Rajhans Singh, Tempe, AZ (US); Ankita Shukla, Tempe, AZ (US); Pavan Turaga, Chandler, AZ (US)

(72) Inventors: Rajhans Singh, Tempe, AZ (US); Ankita Shukla, Tempe, AZ (US); Pavan Turaga, Chandler, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 190 days.

(21) Appl. No.: 18/672,711

(22) Filed: May 23, 2024

(65) Prior Publication Data

US 2024/0395016 A1 Nov. 28, 2024

Related U.S. Application Data

(60) Provisional application No. 63/503,930, filed on May 23, 2023.

(51) Int. Cl.

*G06V 10/764* (2022.01)

*G06V 10/24* (2022.01)

(Continued)

(52) U.S. Cl.

CPC .......... *G06V 10/764* (2022.01); *G06V 10/247* (2022.01); *G06V 10/44* (2022.01); *G06V 10/774* (2022.01); *G06V 10/82* (2022.01)

(58) Field of Classification Search

None

See application file for complete search history.

(56) References Cited

U.S. PATENT DOCUMENTS 10,275,713 B2 4/2019 Bhat et al.

11,508,167 B2 * 11/2022 Deng .................... G06V 10/82

(Continued)

FOREIGN PATENT DOCUMENTS

WO 2021243903 A1 12/2021

OTHER PUBLICATIONS

Alajlan et al., "Geometry-based image retrieval in binary image databases", IEEE transactions on pattern analysis and machine intelligence, vol. 30, No. 6, Jun. 2008, p. 1003-1013.

(Continued)

*Primary Examiner* — Edward Park

(74) *Attorney, Agent, or Firm* — Shumaker & Sieffert, P.A.

(57) ABSTRACT

A Deep Geometric Moment framework (DGM framework) may be trained to perform an image classification task using a training dataset having a plurality of images. Training the DGM framework may include generating 2D coordinate grids for the plurality of images and computing coordinate bases. The training may further include extracting image features for the plurality of images and computing geometric moments for the image features. Training the DGM framework may include generating predicted affine transformation parameters to transform the 2D coordinate bases into a transformed coordinate grid and generating new coordinate bases and new geometric moments learned from the image features to reconstruct the plurality of images using the transformed coordinate grid. The DGM framework may output an Artificial Intelligence model (AI model) trained to perform the image classification task for an input image.

20 Claims, 15 Drawing Sheets

(51) Int. Cl.
*G06V 10/44* (2022.01)
*G06V 10/774* (2022.01)
*G06V 10/82* (2022.01)

(56) References Cited

U.S. PATENT DOCUMENTS

| | | | | |
|---|---|---|---|---|
| 12,141,941 | B2 | 11/2024 | Karras et al. | |
| 2021/0350620 | A1* | 11/2021 | Bronstein | G06N 3/0464 |
| 2022/0122250 | A1* | 4/2022 | Besson | G06N 3/0464 |
| 2022/0138193 | A1 | 5/2022 | Xu et al. | |
| 2022/0147790 | A1 | 5/2022 | Zafeiriou et al. | |
| 2024/0395016 | A1* | 11/2024 | Singh | G06V 10/764 |
| 2025/0017694 | A1* | 1/2025 | Gandrud | G06N 3/084 |
| 2025/0111281 | A1 | 4/2025 | Papa et al. | |

OTHER PUBLICATIONS

Anokhin et al., "Image generators with conditionally-independent pixel synthesis", Proceedings of the IEEE/CVF Conference on Computer Vision and Pattern Recognition, Nov. 27, 2020, p. 14278-14287.

Arjovsky et al., "Wasserstein generative adversarial networks", International conference on machine learning, PMLR, Jul. 17, 2017, p. 214-223.

Barron et al., "Mip-NeRF 360: Unbounded anti-aliased neural radiance fields", Proceedings of the IEEE/CVF Conference on Computer Vision and Pattern Recognition, Mar. 25, 2022, p. 5470-5479.

Brock et al., "Large scale gan training for high fidelity natural image synthesis", arXiv:1809.11096v1, Sep. 28, 2018, 29 pp.

Chen et al., "DeepLab: Semantic Image Segmentation with Deep Convolutional Nets, Atrous Convolution, and Fully Connected CRFs", IEEE transactions on pattern analysis and machine intelligence, vol. 40, No. 4, IEEE, Apr. 27, 2017, p. 834-848.

Chen et al., "Encoder-decoder with atrous separable convolution for semantic image segmentation", Proceedings of the European conference on computer vision (ECCV), Aug. 22, 2018, p. 801-818.

Chen et al., "InfoGAN: Interpretable Representation Learning by Information Maximizing Generative Adversarial Nets", 30th Conference on Neural Information Processing Systems (NIPS 2016), Jun. 12, 2016, p. 2180-2188.

Chen et al., "Learning continuous image representation with local implicit image function", Proceedings of the IEEE/CVF conference on computer vision and pattern recognition, Apr. 1, 2021, p. 8628-8638.

Chen et al., "Searching for efficient multi-scale architectures for dense image prediction", 32nd Conference on Neural Information Processing Systems (NeurIPS 2018), Sep. 11, 2018, 12 pp.

Cheng et al., "Learning rotation-invariant convolutional neural networks for object detection in vhr optical remote sensing images", IEEE Transactions on Geoscience and Remote Sensing, vol. 54, No. 12, IEEE, Sep. 5, 2016, p. 7405-7415.

Chng et al., "Gaussian activated neural radiance fields for high fidelity reconstruction and pose estimation", Computer Vision-ECCV 2022: 17th European Conference, Springer, Oct. 23, 2022, p. 264-280.

Chong et al., "Translation and scale invariants of legendre moments", Pattern recognition, vol. 37, No. 1, Elsevier, Jun. 30, 2003, p. 119-129.

Cordts et al., "The cityscapes dataset for semantic urban scene understanding", Proceedings of the IEEE conference on computer vision and pattern recognition, Apr. 7, 2016, p. 3213-3223.

Dai et al., "Deformable convolutional networks", Proceedings of the IEEE international conference on computer vision, IEEE, Jun. 5, 2017, p. 764-773.

Deng et al., "Imagenet: A large-scale hierarchical image database", 2009 IEEE conference on computer vision and pattern recognition, IEEE, Jun. 20, 2009, p. 248-255.

Dhariwal et al., "Diffusion models beat gans on image synthesis", 35th Conference on Neural Information Processing Systems (NeurIPS 2021), vol. 34, Dec. 6, 2021, p. 8780-8794.

Dosovitskiy et al., "An image is worth 16x16 words: Transformers for image recognition at scale", arXiv:2010.11929v2, Jun. 3, 2021, 22 pp.

Elad et al., "On bending invariant signatures for surfaces", IEEE Transactions on pattern analysis and machine intelligence, vol. 25, No. 10, IEEE, Sep. 29, 2003, p. 1285-1295.

Everingham et al., "The pascal visual object classes challenge: A retrospective", International journal of computer vision, vol. 111, No. 1, Jan. 2015, p. 98-136.

Flusser et al., "Moment Forms Invariant to Rotation and Blur in Arbitrary Number of Dimensions", IEEE Transactions on Pattern Analysis and Machine Intelligence, vol. 25, No. 2, IEEE, Feb. 19, 2003, p. 234-246.

Flusser et al., "Moments and moment invariants in pattern recognition", vol. 46, No. 1, John Wiley & Sons, Dec. 14, 2009, 312 pp.

Flusser et al., "Pattern recognition by affine moment invariants", vol. 26, No. 1, Pattern Recognition Society, Jun. 2, 1992, pp. 167-174.

Follmann et al., "A rotationally-invariant convolution module by feature map back-rotation", 2018 IEEE Winter Conference on Applications of Computer Vision, IEEE, Mar. 12, 2018, p. 784-792.

Fons et al., "HyperTime: Implicit Neural Representation for Time Series", arXiv:2208.05836v1, Aug. 11, 2022, 13 pp.

Foulonneau et al., "Affine-invariant geometric shape priors for region-based active contours", IEEE transactions on pattern analysis and machine intelligence, vol. 28, No. 8, IEEE, Aug. 31, 2006, p. 1352-1357.

Fu et al., "Panoptic nerf: 3d-to-2d label transfer for panoptic urban scene segmentation", 2022 International Conference on 3D Vision (3DV), IEEE, Sep. 12, 2022, pp. 301-311.

Gansbeke et al., "Scan: Learning to classify images without labels", arXiv:2005.12320v2, Jul. 3, 2020, p. 268-285.

Gao et al., "Dynamic view synthesis from dynamic monocular video", Proceedings of the IEEE/CVF International Conference on Computer Vision, May 13, 2021, p. 5712-5721.

Geirhos et al., "Imagenet-trained cnns are biased towards texture; increasing shape bias improves accuracy and robustness", arXiv: 1811.12231v3, Nov. 29, 2018, 22 pp.

Girshick et al., "Rich feature hierarchies for accurate object detection and semantic segmentation", Proceedings of the IEEE conference on computer vision and pattern recognition, Oct. 22, 2014, p. 580-587.

Goodfellow et al., "Generative adversarial nets", Advances in neural information processing systems, vol. 27, Jun. 10, 2014, 9 pp.

Goodfellow et al., "Generative adversarial networks", Communications of the ACM, vol. 63, No. 11, Nov. 2020, p. 139-144.

Gulrajani et al., "Improved Training of Wasserstein GANs", Advances in neural information processing systems, vol. 30, Dec. 25, 2017, 11 pp.

Harkonen et al., "GANSpace: Discovering Interpretable GAN Controls", 34th Conference on Neural Information Processing Systems (NeurIPS 2020), vol. 33, Dec. 14, 2020, 10 pp.

He et al., "Deep residual learning for image recognition", Proceedings of the IEEE conference on computer vision and pattern recognition, IEEE, Dec. 10, 2015, p. 770-778.

He et al., "Mask R-CNN", Proceedings of the IEEE international conference on computer vision, Jan. 24, 2018, p. 2961-2969.

Hendrycks et al., "Benchmarking neural network robustness to common corruptions and perturbations", arXiv:1903.12261v1, Mar. 28, 2019, 16 pp.

Heusel et al., "Gans trained by a two time-scale update rule converge to a local nash equilibrium", 31st Conference on Neural Information Processing Systems (NIPS 2017), vol. 30, Jan. 12, 2018, 12 pp.

Ho et al., "Cascaded diffusion models for high fidelity image generation", Journal of Machine Learning Research, vol. 23, No. 47, Jan. 2022, 33 pp.

Honarvar et al., "Image reconstruction from a complete set of geometric and complex moments", Signal Processing, vol. 98, Elsevier B.V., Dec. 10, 2013, p. 224-232.

(56) References Cited

OTHER PUBLICATIONS

Howard et al., "Mobilenets: Efficient convolutional neural networks for mobile vision applications", arXiv:1704.04861v1, Apr. 17, 2017, 9 pp.
Hu et al., "Visual pattern recognition by moment invariants", IRE transactions on information theory, vol. 8, No. 2, Feb. 1962, p. 179-187.
Ioffe et al., "Batch normalization: Accelerating deep network training by reducing internal covariate shift", ArXiv:1502.03167v3, PMLR, Mar. 2, 2015, 11 pp.
Jaderberg et al., "Spatial transformer networks", Advances in neural information processing systems, vol. 28, Feb. 4, 2016, p. 2017-2025.
Jain et al., "Putting NeRF on a Diet: Semantically Consistent Few-Shot View Synthesis", Proceedings of the IEEE/CVF International Conference on Computer Vision, Apr. 1, 2021, p. 5885-5894.
Joseph-Rivlin et al., "Momen(e)t: Flavor the Moments in Learning to Classify Shapes", Proceedings of the IEEE/CVF International Conference on Computer Vision Workshops, IEEE, Oct. 3, 2019, 10 pp.
Karras et al., "A style-based generator architecture for generative adversarial networks", Proceedings of the IEEE/CVF conference on computer vision and pattern recognition, Mar. 29, 2019, p. 4401-4410.
Karras et al., "Alias-free generative adversarial networks", Advances in Neural Information Processing Systems, vol. 34, Dec. 6, 2021, p. 852-863.
Karras et al., "Analyzing and Improving the Image Quality of StyleGAN", Proceedings of the IEEE/CVF conference on computer vision and pattern recognition, Mar. 23, 2020, p. 8110-8119.
Khotanzad et al., "Invariant image recognition by zernike moments", IEEE Transactions on pattern analysis and machine intelligence, vol. 12, No. 5, IEEE, May 1990, p. 489-497.
Kim et al., "Invariant image watermark using zernike moments", IEEE transactions on Circuits and Systems for Video Technology, vol. 13, No. 8, IEEE, Aug. 2003, p. 766-775.
Kingma et al., "Auto-encoding variational bayes", arXiv:1312.6114v1, Dec. 20, 2013, 9 pp.
Kingma et al., "Stochastic gradient VB and the variational auto-encoder", Second International Conference on Learning Representations, vol. 19, ICLR, Apr. 2014, 29 pp.
Krizhevsky et al., "Imagenet classification with deep convolutional neural networks", Advances in neural information processing systems, vol. 25, 2012, p. 1097-1105, (Applicant points out, in accordance with MPEP 609.04(a), that the year of publication, 2012, is sufficiently earlier than the effective U.S. filing date, so that the particular month of publication is not an issue.).
Krizhevsky et al., "Learning multiple layers of features from tiny images", Citeseer, Apr. 8, 2009, 60 pp.
Kynkaanniemi et al., "Improved precision and recall metric for assessing generative models", Advances in Neural Information Processing Systems, vol. 32, Oct. 30, 2019, 10 pp.
Lee et al., "Vitgan: Training gans with vision transformers", arXiv:2107.04589v1, Jul. 9, 2021, 13 pp.
Li et al., "Ggm-net: Graph geometric moments convolution neural network for point cloud shape classification", IEEE Access, vol. 8, IEEE, Jul. 20, 2020, p. 124989-124998.
Luciano et al., "Deep learning with geodesic moments for 3d shape classification", Pattern Recognition Letters, vol. 105, Elsevier B.V., Apr. 1, 2018, p. 182-190.
Maddigan et al., "Chat2VIS: Generating Data Visualisations via Natural Language using ChatGPT, Codex, and GPT-3 Large Language Models", vol. 11, IEEE Access, May 12, 2023, p. 45181-45193.
Martin-Brualla et al., "Nerf in the wild: Neural radiance fields for unconstrained photo collections", Proceedings of the IEEE/CVF Conference on Computer Vision and Pattern Recognition, Jan. 6, 2021, p. 7210-7219.
Mescheder et al., "Occupancy networks: Learning 3d reconstruction in function space", Proceedings of the IEEE/CVF conference on computer vision and pattern recognition, Apr. 30, 2019, p. 4460-4470.
Mildenhall et al., "Nerf: Representing scenes as neural radiance fields for view synthesis", Communications of the ACM, vol. 65, No. 1, Dec. 17, 2021, pp. 99-106.
Miyato et al., "Spectral normalization for generative adversarial networks", arXiv:1802.05957v1, Feb. 16, 2018, 26 pp.
Nash et al., "Generating images with sparse representations", Proceedings of the 38 th International Conference on Machine Learning, PMLR, Mar. 5, 2021, p. 7958-7968.
Ntavelis et al., "Arbitrary-scale image synthesis", Proceedings of the IEEE/CVF Conference on Computer Vision and Pattern Recognition, Apr. 5, 2022, p. 11533-11542.
Park et al., "Nerfies: Deformable neural radiance fields", Proceedings of the IEEE/CVF International Conference on Computer Vision, Sep. 10, 2021, p. 5865-5874.
Peebles et al., "Scalable diffusion models with transformers", Mar. 2, 2023, 11 pp.
Pumarola et al., "D-NeRF: Neural Radiance Fields for Dynamic Scenes", Proceedings of the IEEE/CVF Conference on Computer Vision and Pattern Recognition, IEEE, Nov. 2, 2021, p. 10318-10327.
Radford et al., "Unsupervised representation learning with deep convolutional generative adversarial networks", arXiv preprint arXiv:1511.06434, Nov. 19, 2015, 15 pp.
Ramasinghe et al., "Beyond periodicity: Towards a unifying framework for activations in coordinate-mlps", Computer Vision—ECCV 2022: 17th European Conference, Springer, Oct. 23, 2022, p. 142-158.
Reed et al., "Dynamic ct reconstruction from limited views with implicit neural representations and parametric motion fields", Proceedings of the IEEE/CVF International Conference on Computer Vision, IEEE, Apr. 23, 2021, p. 2258-2268.
Reeves et al., "Three-dimensional shape analysis using moments and fourier descriptors", IEEE Transactions on Pattern Analysis and Machine Intelligence, vol. 10, No. 6, IEEE, Nov. 1988, p. 937-943.
Ren et al., "Faster R-CNN: Towards Real-Time Object Detection with Region Proposal Networks", Advances in neural information processing systems, vol. 28, Jun. 6, 2015, p. 91- 99.
Roich et al., "Pivotal tuning for latent-based editing of real images", ACM Transactions on Graphics (TOG), vol. 42, No. 1, Aug. 12, 2022, 13 pp.
Ronneberger et al., "U-net: Convolutional networks for biomedical image segmentation", arXiv: 1505.04597v1, May 18, 2015, p. 234-241.
Russakovsky et al., "Imagenet large scale visual recognition challenge", International journal of computer vision, vol. 115, No. 3, Springer, Dec. 2015, p. 211-252.
Sadjadi et al., "Three-dimensional moment invariants", IEEE Transactions on Pattern Analysis and Machine Intelligence, vol. 2, IEEE, Mar. 1980, pp. 127-136.
Salimans et al., "Improved Techniques for Training GANs", Advances in neural information processing systems, vol. 29, Jun. 10, 2016, 9 pp.
Sandler et al., "Mobilenetv2: Inverted residuals and linear bottlenecks", Proceedings of the IEEE conference on computer vision and pattern recognition, IEEE, Mar. 21, 2019, p. 4510-4520.
Sauer et al., "Projected GANs Converge Faster", Advances in Neural Information Processing Systems, vol. 34, Dec. 6, 2021, p. 17480-17492.
Sauer et al., "StyleGAN-XL: Scaling StyleGAN to Large Diverse Datasets", ACM SIGGRAPH 2022 Conference Proceedings, Aug. 7, 2022, 10 pp.
Selvaraju et al., "Gradcam: Visual explanations from deep networks via gradient-based localization", Proceedings of the IEEE international conference on computer vision, Dec. 3, 2019, p. 618-626.
Singh et al., "Improving Shape Awareness and Interpretability in Deep Networks Using Geometric Moments", Proceedings of the IEEE/CVF Conference on Computer Vision and Pattern Recognition, May 22, 2023, pp. 4159-4168.

(56) References Cited

OTHER PUBLICATIONS

Singh et al., "Non-parametric priors for generative adversarial networks", Proceedings of the 36 th International Conference on Machine Learning, PMLR, May 24, 2019, p. 5838-5847.
Singh et al., "Polynomial Implicit Neural Representations For Large Diverse Datasets", Proceedings of the IEEE/CVF Conference on Computer Vision and Pattern Recognition, IEEE, Mar. 20, 2023, pp. 2041-2051.
Sitzmann et al., "Implicit neural representations with periodic activation functions", 34th Conference on Neural Information Processing Systems (NeurIPS 2020), vol. 33, Jun. 17, 2020, p. 7462-7473.
Sitzmann et al., "Light field networks: Neural scene representations with single-evaluation rendering", Advances in Neural Information Processing Systems, vol. 34, Dec. 6, 2021, p. 19313-19325.
Sitzmann et al., "Scene Representation Networks: Continuous 3D-Structure-Aware Neural Scene Representations", 33rd Conference on Neural Information Processing Systems (NeurIPS 2019), vol. 32, Jan. 28, 2020, 12 pp.
Skorokhodov et al., "Adversarial generation of continuous images", Proceedings of the IEEE/CVF Conference on Computer Vision and Pattern Recognition, Jun. 28, 2021, p. 10753-10764.
Skorokhodov et al., "Aligning latent and image spaces to connect the unconnectable", Proceedings of the IEEE/CVF International Conference on Computer Vision, Apr. 14, 2021, p. 14144-14153.
Szegedy et al., "Going deeper with convolutions", Proceedings of the IEEE conference on computer vision and pattern recognition, IEEE, Sep. 17, 2014, 9 pp.
Tan et al., "EfficientNet: Rethinking Model Scaling for Convolutional Neural Networks", arXiv:1905.11946v5, PMLR, Sep. 11, 2020, p. 6105-6114.
Tancik et al., "Fourier features let networks learn high frequency functions in low dimensional domains", 34th Conference on Neural Information Processing Systems (NeurIPS 2020), vol. 33, Jun. 18, 2020, p. 7537-7547.
Teague et al., "Image analysis via the general theory of moments", Journal of the Optical Society of America, vol. 70, No. 8, Optical Society of America, Nov. 1, 1979, pp. 920-930.
Theodoridis et al., "Zernike pooling: Generalizing average pooling using zernike moments", vol. 9, IEEE Access, Sep. 8, 2021, p. 121128- 121136.
Touvron et al., "Training data-efficient image transformers & distillation through attention", Proceedings of the 38 th International Conference on Machine Learning, PMLR, Jul. 1, 2021, p. 10347-10357.
Tov et al., "Designing an encoder for stylegan image manipulation", ACM Transactions on Graphics (TOG), vol. 40, No. 4, Association for Computing Machinery, Aug. 2021, 14 pp.
Tuceryan et al., "Moment-based texture segmentation", Pattern recognition letters, vol. 15, No. 7, Jul. 1, 1994, p. 659-668.
U.S. Appl. No. 18/735,585, filed Jun. 6, 2024, naming inventors Singh et al.
Wang et al., "Using zernike moments for the illumination and geometry invariant classification of multispectral texture", IEEE Transactions on Image Processing, vol. 7, No. 2, IEEE, Feb. 1998, pp. 196-203.
Wu et al., "Momentsnet: a simple learningfree method for binary image recognition", 2017 IEEE International Conference on Image Processing (ICIP), IEEE, Sep. 17, 2017, p. 2667-2671.
Xian et al., "Space-time neural irradiance fields for free-viewpoint video", Proceedings of the IEEE/CVF Conference on Computer Vision and Pattern Recognition, Jun. 18, 2021, p. 9421-9431.
Xu et al., "Towards learning affine-invariant representations via data-efficient cnns", Proceedings of the IEEE/CVF Winter Conference on Applications of Computer Vision, Aug. 31, 2019, p. 904-913.
Yap et al., "An efficient method for the computation of legendre moments", IEEE Transactions on Pattern Analysis and Machine Intelligence, vol. 27, No. 12, IEEE, Dec. 2005, p. 1996-2002.
Yariv et al., "Multiview neural surface reconstruction by disentangling geometry and appearance", 34th Conference on Neural Information Processing Systems (NeurIPS 2020), vol. 33, Oct. 25, 2020, pp. 2492-2502.
Yoon et al., "Spheresr: 360deg image super-resolution with arbitrary projection via continuous spherical image representation", Proceedings of the IEEE/CVF Conference on Computer Vision and Pattern Recognition, Dec. 14, 2021, p. 5677-5686.
Yu et al., "pixelNeRF: Neural Radiance Fields from One or Few Images", Proceedings of the IEEE/CVF Conference on Computer Vision and Pattern Recognition, May 30, 2021, p. 4578-4587.
Zhang et al., "Affine legendre moment invariants for image watermarking robust to geometric distortions", IEEE Transactions on Image Processing, vol. 20, No. 8, IEEE, Aug. 2011, p. 2189-2199.
Zhang et al., "Blurred image recognition by legendre moment invariants", IEEE Transactions on Image Processing, vol. 19, No. 3, IEEE, Mar. 2010, p. 596-611.
Zhao et al., "Improved transformer for high-resolution gans", 35th Conference on Neural Information Processing Systems (NeurIPS 2021), vol. 34, Dec. 6, 2021, p. 18367-18380.
Zhu et al., "A natural language interface to a graph-based bibliographic information retrieval sxstem", Data & Knowledge Engineering, vol. 111, Elsevier, Sep. 1, 2017, 33 pp.
Barron et al., "Mip-NeRF: A Multiscale Representation for Anti-Aliasing Neural Radiance Fields", Proceedings of the IEEE/CVF international conference on computer vision, 2021, pp. 5855-5864, (Applicant points out, in accordance with MPEP 609.04(a), that the year of publication, 2021, is sufficiently earlier than the effective U.S. filing date, so that the particular month of publication is not an issue.).
Borgefors, "Hierarchical Chamfer Matching: A Parametric Edge Matching", IEEE Transactions on pattern analysis and machine intelligence, vol. 10, No. 6, IEEE, Nov. 1988, pp. 849-865.
Cai et al., "Split-Layer: Enhancing Implicit Neural Representation by Maximizing the Dimensionality of Feature Space", The Fortieth AAAI Conference on Artificial Intelligence, vol. 40, No. 4, Mar. 14, 2026, pp. 2561-2570.
Chen et al., "Control-A-Video: Controllable Text-to-Video Diffusion Models with Motion Prior and Reward Feedback Learning", arXiv:2305.13840v3, Aug. 12, 2024, 20 pp.
Chen et al., "Control3D: Towards Controllable Text-to-3D Generation", Proceedings of the 31st ACM International Conference on Multimedia, ACM, Oct. 29, 2023, pp. 1148-1156.
Chen et al., "Fantasia3D: Disentangling Geometry and Appearance for High-quality Text-to-3D Content Creation", Proceedings of the IEEE/CVF international conference on computer vision, 2023, pp. 22246-22256, (Applicant points out, in accordance with MPEP 609.04(a), that the year of publication, 2023, is sufficiently earlier than the effective U.S. filing date, so that the particular month of publication is not an issue.).
Chen et al., "Text-to-3D using Gaussian Splatting", Proceedings of the IEEE/CVF conference on computer vision and pattern recognition, 2024, pp. 21401-21412, (Applicant points out, in accordance with MPEP 609.04(a), that the year of publication, 2024, is sufficiently earlier than the effective U.S. filing date, so that the particular month of publication is not an issue.).
Cheng et al., "SDFusion: Multimodal 3D Shape Completion, Reconstruction, and Generation", Proceedings of the IEEE/CVF conference on computer vision and pattern recognition, 2023, pp. 4456-4465, (Applicant points out, in accordance with MPEP 609.04(a), that the year of publication, 2023, is sufficiently earlier than the effective U.S. filing date, so that the particular month of publication is not an issue.).
Deitke et al., "Objaverse: A Universe of Annotated 3D Objects", Proceedings of the IEEE/CVF conference on computer vision and pattern recognition, 2023, pp. 13142-13153, (Applicant points out, in accordance with MPEP 609.04(a), that the year of publication, 2023, is sufficiently earlier than the effective U.S. filing date, so that the particular month of publication is not an issue.).
Hu et al., "LoRA: Low-Rank Adaptation of Large Language Models", arXiv:2106.09685v1, Jun. 17, 2021, 20 pp.
Huang et al., "DreamControl: Control-Based Text-to-3D Generation with 3D Self-Prior", Proceedings of the IEEE/CVF conference on

(56) References Cited

OTHER PUBLICATIONS computer vision and pattern recognition, 2024, pp. 5364-5373, (Applicant points out, in accordance with MPEP 609.04(a), that the year of publication, 2024, is sufficiently earlier than the effective U.S. filing date, so that the particular month of publication is not an issue.).
Jun et al., "Shap. E: Generating Conditional 3D Implicit Functions", arXiv:2305.02463v1, May 3, 2023, 23 pp.
Kerbl et al., "3D Gaussian Splatting for Real-Time Radiance Field Rendering", Nov. 20, 2023, 25 pp.
Li et al., "Sweetdreamer: Aligning geometric priors in 2d diffusion for consistent text-to-3d", International conference on learning representations, 2024, 23 pp., (Applicant points out, in accordance with MPEP 609.04(a), that the year of publication, 2024, is sufficiently earlier than the effective U.S. filing date, so that the particular month of publication is not an issue.).
Lin et al., "Magic3D: High-Resolution Text-to-3D Content Creation", Proceedings of the IEEE/CVF conference on computer vision and pattern recognition, 2023, pp. 300-309, (Applicant points out, in accordance with MPEP 609.04 (a), that the year of publication, 2023, is sufficiently earlier than the effective U.S. filing date, so that the particular month of publication is not an issue.).
Liu et al., "Syncdreamer: Generating multiview-consistent images from a single-view image", International conference on learning representations, May 31, 2024, 22 pp.
Liu et al., "Zero-1-to-3: Zero-shot One Image to 3D Object", Proceedings of the IEEE/CVF international conference on computer vision, 2023, pp. 9298-9309, (Applicant points out, in accordance with MPEP 609.04(a), that the year of publication, 2023, is sufficiently earlier than the effective U.S. filing date, so that the particular month of publication is not an issue.).
Long et al., "Wonder3D: Single Image to 3D using Cross-Domain Diffusion", Proceedings of the IEEE/CVF conference on computer vision and pattern recognition, 2023, pp. 9970-9980, (Applicant points out, in accordance with MPEP 609.04(a), that the year of publication, 2023, is sufficiently earlier than the effective U.S. filing date, so that the particular month of publication is not an issue.).
Luo et al., "Scalable 3D Captioning with Pretrained Models", 37th Conference on Neural Information Processing Systems, Dec. 15, 2023, 31 pp., (Applicant points out, in accordance with MPEP 609.04(a), that the year of publication, 2023, is sufficiently earlier than the effective U.S. filing date, so that the particular month of publication is not an issue.).
Metzer et al., "Latent-NeRF for Shape-Guided Generation of 3D Shapes and Textures", Proceedings of the IEEE/ Cvf conference on computer vision and pattern recognition, 2023, pp. 12663-12673, (Applicant points out, in accordance with MPEP 609.04(a), that the year of publication, 2023, is sufficiently earlier than the effective U.S. filing date, so that the particular month of publication is not an issue.).
Muller et al., "Instant Neural Graphics Primitives with a Multiresolution Hash Encoding", ACM transactions on graphics, vol. 41, No. 4, Jul. 22, 2022, 15 pp.
Nichol et al., "GLIDE: Towards Photorealistic Image Generation and Editing with Text-Guided Diffusion Models", arXiv:2112.10741v3, Mar. 8, 2022, 20 pp.
Nichol et al., "Point.E: A System for Generating 3D Point Clouds from Complex Prompts", arXiv:2212.08751v1, Dec. 16, 2022, 14 pp.
Notice of Allowance from U.S. Appl. No. 18/735,585 dated Apr. 17, 2026, 11 pp.
Poole et al., "Dreamfusion: Text-to-3d using 2d diffusion", arXiv:2209.14988v1, Sep. 29, 2022, 18 pp.
Reimers et al., "Sentence-BERT: Sentence Embeddings using Siamese BERT-Networks", Proceedings of the 2019 Conference on Empirical Methods in Natural Language Processing and the 9th International Joint Conference on Natural Language Processing, Association for Computational Linguistics, Nov. 3, 2019, pp. 3982-3992.
Rombach et al., "High-Resolution Image Synthesis with Latent Diffusion Models", Proceedings of the IEEE/CVF conference on computer vision and pattern recognition, 2022, pp. 10684-10695, (Applicant points out, in accordance with MPEP 609.04(a), that the year of publication, 2022, is sufficiently earlier than the effective U.S. filing date, so that the particular month of publication is not an issue.).
Ruiz et al., "Dreambooth: Fine tuning text-to-image diffusion models for subject-driven generation", Proceedings of the IEEE/ CVF conference on computer vision and pattern recognition, 2023, pp. 22500-22510, (Applicant points out, in accordance with MPEP 609.04(a), that the year of publication, 2023, is sufficiently earlier than the effective U.S. filing date, so that the particular month of publication is not an issue.).
Saharia et al., "Photorealistic Text-to-Image Diffusion Models with Deep Language Understanding", 36th Conference on Neural Information Processing Systems, Dec 6, 2022, 16 pp.
Seo et al., "Let 2d diffusion model know 3d-consistency for robust text-to-3d generation", arXiv:2303.07937v4, Feb. 6, 2024, 20 pp.
Shao et al., "Control4D: Efficient 4D Portrait Editing with Text", Proceedings of the IEEE/CVF Conference on Computer Vision and Pattern Recognition, 2024, pp. 4556-4567, (Applicant points out, in accordance with MPEP 609.04(a), that the year of publication, 2024, is sufficiently earlier than the effective U.S. filing date, so that the particular month of publication is not an issue.).
Shi et al., "Mvdream: Multi-view diffusion for 3d generation", International conference on learning representations, May 31, 2024, 22 pp.
Tang et al., "Make-It-3D: High-Fidelity 3D Creation from A Single Image with Diffusion Prior", Proceedings of the IEEE/CVF international conference on computer vision, 2023, pp. 22819-22829, (Applicant points out, in accordance with MPEP 609.04(a), that the year of publication, 2023, is sufficiently earlier than the effective U.S. filing date, so that the particular month of publication is not an issue.).
Wang et al., "ProlificDreamer: High-Fidelity and Diverse Text-to-3D Generation with Variational Score Distillation", 37th Conference on Neural Information Processing Systems, vol. 36, Dec. 15, 2023, 36 pp.
Wei et al., "ELITE: Encoding Visual Concepts into Textual Embeddings for Customized Text-to-Image Generation", Proceedings of the IEEE/CVF international conference on computer vision, 2023, pp. 15943-15953, (Applicant points out, in accordance with MPEP 609.04(a), that the year of publication, 2023, is sufficiently earlier than the effective U.S. filing date, so that the particular month of publication is not an issue.).
Wei et al., "TAPS3D: Text-Guided 3D Textured Shape Generation from Pseudo Supervision", Proceedings of the IEEE/CVF conference on computer vision and pattern recognition, 2023, pp. 16805-16815, (Applicant points out, in accordance with MPEP 609.04(a), that the year of publication, 2023, is sufficiently earlier than the effective U.S. filing date, so that the particular month of publication is not an issue.).
Yuanchen et al., "threestudio: A unified framework for 3d content generation", Github, Dec. 16, 2024, 21 pp., URL: https://github.com/threestudio-project/threestudio.
Zhang et al., "Adding Conditional Control to Text-to-Image Diffusion Models", Proceedings of the IEEE/CVF international conference on computer vision, 2023, pp. 3836-3847, (Applicant points out, in accordance with MPEP 609.04(a), that the year of publication, 2023, is sufficiently earlier than the effective U.S. filing date, so that the particular month of publication is not an issue.).
Zhang et al., "Controlvideo: Training-free controllable text-to-video generation", InternationalRepresentations, May 31, 2024, 21 pp.
Office Action from U.S. Appl. No. 18/735,585 dated Jun. 2, 2026, 9 pp.
Notice of Allowance from U.S. Appl. No. 18/735,585 dated Jul. 20, 2026, 8 pp.

* cited by examiner

401 - TABLE 1:

| | MODEL | PARAMS (M) | 415 CIFAR 10(%) | 420 CIFAR 100(%) |
|---|---|---|---|---|
| 451 | DGM LEVEL-1 | 0.44 | 84.79 | 59.07 |
| 452 | DGM LEVEL-2 | 1.37 | 88.77 | 68.07 |
| 453 | DGM LEVEL-3 | 2.30 | 90.09 | 69.72 |
| 454 | DGM LEVEL-4 | 3.23 | 90.28 | 70.56 |
| 455 | DGM LEVEL-4 (W/O AFFINE) | **2.03** | **88.47** | **66.6** |

FIG. 4

501 - TABLE 2:

| | MODEL | PARAMS (M) | 515 CIFAR 10(%) | 520 CIFAR 100(%) |
|---|---|---|---|---|
| 530 | RESNET-18 (W/O POOLING) | 9.62 | 94.78 | 76.93 |
| 535 | DGM RESNET-18 | 11.61 | **95.51** | **80.60** |
| 540 | RESNET-34 (W/O POOLING) | 18.94 | 95.46 | 78.42 |
| 545 | DGM RESNET-34 | 21.06 | **96.27** | **82.13** |

FIG. 5

601 – TABLE 3:

| | MODEL | PARAMS (M) | ACCURACY 10(%) |
|---|---|---|---|
| 630 | RESNET-18 (W/O POOLING) | 9.89 | 68.42 |
| 635 | DGM RESNET-18 | 11.88 | **72.36** |
| 640 | RESNET-34 (W/O POOLING) | 19.20 | 73.34 |
| 645 | DGM RESNET-34 | 21.32 | **75.63** |

FIG. 6

701 – TABLE 4:

| MODEL | PARAMS (M) | CIFAR 10(%) | CIFAR 100(%) |
|---|---|---|---|
| 730 RESNET-18 | 11.17 | 95.37 | 77.35 |
| 735 DGM RESNET-18 | 11.61 | **95.51** | **80.60** |
| 740 RESNET-34 | 21.33 | 95.58 | 78.83 |
| 745 DGM RESNET-34 | 21.06 | **96.27** | **82.13** |
| 760 MOBILENET | 3.93 | 93.62 | 73.53 |
| 765 DGM MOBILENET | 4.50 | **96.33** | **82.19** |

FIG. 7A

702 – TABLE 5:

| | MODEL | PARAMS (M) | ACCURACY 10(%) |
|---|---|---|---|
| 730 | RESNET-18 | 11.69 | 71.23 |
| 735 | DGM RESNET-18 | 11.88 | **72.36** |
| 740 | RESNET-34 | 21.80 | 74.58 |
| 745 | DGM RESNET-34 | 21.32 | **75.63** |
| 750 | RESNET-50 | 25.56 | 76.92 |
| 755 | DGM RESNET-50 | 23.51 | **77.06** |
| 760 | MOBILENET | 4.20 | 70.66 |
| 765 | DGM MOBILENET | 4.76 | **72.69** |

FIG. 7B

801 – TABLE 6:

| MODEL | PARAMS (M) | CIFAR 10(%) | CIFAR 100(%) |
|---|---|---|---|
| 835 DGM RESNET-18 | 11.69 | 93.79 | 75.83 |
| 845 DGM RESNET-34 | 21.32 | 94.01 | 77.51 |
| 865 DGM MOBILENET | 4.76 | 93.87 | 75.92 |

FIG. 8

1001 – TABLE 7:

| | MODEL | PARAMS (M) | Clean ↑ ACC. (%) | mCE ↓ (%) |
|---|---|---|---|---|
| 1050 | RESNET-50 | 25.56 | 76.92 | 74.97 |
| 1055 | DGM RESNET-50 | 23.51 | 77.06 | **71.74** |

FIG. 10A

1002 – TABLE 8:

| | BACKBONE - 1095 | 1096 SEGMENTATION HEAD | PASCAL VOC (MIOU) | CITYSCAPES (MIOU) |
|---|---|---|---|---|
| 1050 | RESNET-50 | 1 X 1 Conv | 68.59 | 71.92 |
| 1055 | DGM RESNET-50 | 1 X 1 Conv | **78.43** | **74.77** |
| 1050 | RESNET-50 | DeepLabv3+ | 78.36 | 75.34 |
| 1055 | DGM RESNET-50 | DeepLabv3+ | **79.89** | **76.03** |

FIG. 10B

SHAPE AWARENESS AND INTERPRETABILITY IN DEEP NETWORKS USING GEOMETRIC MOMENTS

CLAIM OF PRIORITY

This application claims the benefit of U.S. Patent Application No. 63/503,930, filed 23 May 2023, the entire contents of which is incorporated herein by reference.

GOVERNMENT RIGHTS AND GOVERNMENT AGENCY SUPPORT NOTICE

This invention was made with government support under HR00112290073 awarded by DARPA (Defense Advanced Research Projects Agency). The government has certain rights in the invention.

TECHNICAL FIELD

Embodiments of the invention relate generally to the field of artificial intelligence and machine learning via computational systems and more particularly, to systems, methods, and apparatuses for implementing improved shape awareness and interpretability in deep networks using geometric moments.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Machine learning models have various applications to automatically process inputs and produce outputs considering situational factors and learned information to improve output quality. One area where machine learning models, and neural networks in particular, provide high utility is in the field of image processing.

Within the context of machine learning and with regard to deep learning specifically, a Convolutional Neural Network (CNN, or ConvNet) is a class of deep neural networks, very often applied to analyzing visual imagery. Convolutional Neural Networks are regularized versions of multilayer perceptrons. Multilayer perceptrons are fully connected networks, such that each neuron in one layer is connected to all neurons in the next layer, a characteristic which often leads to a problem of overfitting of the data and the need for model regularization. Convolutional Neural Networks also seek to apply model regularization, but with a distinct approach. Specifically, CNNs take advantage of the hierarchical pattern in data and assemble more complex patterns using smaller and simpler patterns. Consequently, on the scale of connectedness and complexity, CNNs are on the lower extreme.

SUMMARY

In general, this disclosure is directed to improved shape awareness and interpretability in deep networks using geometric moments. In particular, a deep-learning model utilizes geometric moments to measure shape-related properties. A Deep Geometric Moment framework (DGM framework) trains a network for generating coordinate bases and affine parameters for making the features geometrically invariant in a task-specific manner. The DGM framework improves the final interpretation of features within an input image, including providing a highlighted shape detected within an input image. A trained AI model within the DGM framework is demonstrated to be effective on standard image classification datasets and achieves higher classification performance when compared with baseline and standard Residual Network (ResNet) models while substantially improving interpretability of objects within an input image including the shape of such objects.

Prior known techniques fail to adequately define spatial operations for image classification networks and thus, lack wide applicability.

What is needed is an improved technique for defining spatial operations by finding ways to fuse moment-like computations and then permit the networks to learn the suitable basis functions for a given task to improve generalization and target-task applicability.

The present state of the art may therefore benefit from the systems, methods, and apparatuses for implementing improved shape awareness and interpretability in deep networks using geometric moments, as is described herein.

In at least one example, one or more processors of a computing device are configured to perform a computer-implemented method. Such a method may include processing circuitry executing a Deep Geometric Moment framework (DGM framework) to perform an image classification task, the DGM framework having an image feature extraction pipeline and a coordinate bases computation pipeline. The method may include obtaining, using the DGM framework, a training dataset having a plurality of images and training the DGM framework to perform the image classification task by performing training operations. In such an example, the training operations may include generating, using the coordinate bases computation pipeline, 2D coordinate grids for the plurality of images and computing, using the coordinate bases computation pipeline, coordinate bases for the plurality of images using the 2D coordinate bases. The training operations may include obtaining, by the one or more processors using a Residual Network (ResNet) convolutional block of the image feature extraction pipeline, image features for the plurality of images and computing, using the DGM framework, geometric moments for the image features of the plurality of images using the 2D coordinate bases. In such examples, the training operations may include generating, by the one or more processors, predicted affine transformation parameters for the image features to transform the 2D coordinate bases into a transformed coordinate grid using the image features and the geometric moments for the plurality of images and generating new coordinate bases and new geometric moments learned from the image features to reconstruct the plurality of images using the transformed coordinate grid. In such an example, the computer-implemented method may output, by the one or more processors using the DGM framework, an Artificial Intelligence model (AI model) trained to perform the image classification task for an input image.

In at least one example, a system includes processing circuitry; non-transitory computer readable media; and instructions that, when executed by the processing circuitry, configure the processing circuitry to perform operations. In such an example, processing circuitry may configure the system to execute a Deep Geometric Moment framework (DGM framework) to perform an image classification task, the DGM framework having an image feature extraction pipeline and a coordinate bases computation pipeline. In such an example, processing circuitry may obtain, using the DGM framework, a training dataset having a plurality of images. Processing circuitry may be configured to train the DGM framework to perform the image classification task by operations which include the processing circuitry configured to perform training operations. For instance, the training operations may include processing circuitry generating, using the coordinate bases computation pipeline, 2D coordinate grids for the plurality of images. Training may include processing circuitry computing, using the coordinate bases computation pipeline of the DGM framework, coordinate bases for the plurality of images using the 2D coordinate bases. In such examples, processing circuitry may obtain, using a Residual Network (ResNet) convolutional block of the image feature extraction pipeline, image features for the plurality of images. In at least one example, processing circuitry computes, using the DGM framework, geometric moments for the image features of the plurality of images using the 2D coordinate bases and generates predicted affine transformation parameters for the image features to transform the 2D coordinate bases into a transformed coordinate grid using the image features and the geometric moments for the plurality of images. Training may include processing circuitry generating new coordinate bases and new geometric moments learned from the image features to reconstruct the plurality of images using the transformed coordinate grid. In such examples, the system may output, by the processing circuitry using the DGM framework, an Artificial Intelligence model (AI model) trained to perform the image classification task for an input image.

In one example, there is computer-readable storage media having instructions that, when executed, configure processing circuitry to perform operations. Such operations may include executing a Deep Geometric Moment framework (DGM framework) to perform an image classification task, the DGM framework having an image feature extraction pipeline and a coordinate bases computation pipeline and obtaining, using the DGM framework, a training dataset having a plurality of images. The instructions may configure processing circuitry to train the DGM framework to perform the image classification task by performing training operations. In such examples, training operations may include generating, using the coordinate bases computation pipeline, 2D coordinate grids for the plurality of images and computing using the coordinate bases computation pipeline, coordinate bases for the plurality of images using the 2D coordinate bases. The training operations may include obtaining, using a Residual Network (ResNet) convolutional block of the image feature extraction pipeline, image features for the plurality of images and computing, using the DGM framework, geometric moments for the image features of the plurality of images using the 2D coordinate bases. In such examples, the training operations may generate predicted affine transformation parameters for the image features to transform the 2D coordinate bases into a transformed coordinate grid using the image features and the geometric moments for the plurality of images and generate new coordinate bases and new geometric moments learned from the image features to reconstruct the plurality of images using the transformed coordinate grid. The instructions may configure the processing circuitry to output using the DGM framework, an Artificial Intelligence model (AI model) trained to perform the image classification task for an input image.

The details of one or more examples of the disclosure are set forth in the accompanying drawings and the description below. Other features, objects, and advantages will be apparent from the description and drawings, and from the claims.

BRIEF DESCRIPTION OF DRAWINGS

FIG. 4 depicts Table 1 providing a performance comparison of DGM framework with increasing levels on CIFAR datasets, in accordance with aspects of the disclosure.

FIG. 5 depicts Table 2, providing a performance comparison of DGM ResNet-18 and DGM ResNet-34 models implemented by DGM framework and baseline ResNet models (ResNet-18 and ResNet-34 models without pooling layers) on CIFAR datasets, in accordance with aspects of the disclosure.

FIG. 6 depicts Table 3, providing a performance comparison of DGM framework models DGM ResNet-18 and DGM ResNet-34 with baseline ResNet models (ResNet-18 and ResNet-34 models without pooling layers) on the ImageNet dataset, in accordance with aspects of the disclosure.

FIG. 7A depicts Table 4 providing performance improvement results of DGM models DGM ResNet-18, DGM ResNet-34, and DGM MobileNet over standard ResNet models (with pooling layers) on CIFAR datasets, in accordance with aspects of the disclosure.

FIG. 7B depicts Table 5 providing a performance comparison of DGM models DGM ResNet-18, DGM ResNet-34, DGM ResNet-50, and DGM MobileNet with standard ResNet model (with pooling layers) on ImageNet dataset, in accordance with aspects of the disclosure.

FIG. 8 depicts Table 6 providing classification performance results on fine-tuning of pre-trained ImageNet models DGM ResNet-18, DGM ResNet-34, and DGM MobileNet on CIFAR datasets, in accordance with aspects of the disclosure.

FIG. 10A depicts Table 7 providing DGM ResNet-50 model results yield an improvement of 3.2 points on the corrupted images over standard ResNet-50 model results, in accordance with aspects of the disclosure.

FIG. 10B depicts Table 8 providing semantic segmentation performance on PASCAL VOC 2012 and Cityscapes value datasets in terms of mean intersection over union (mIoU), in accordance with aspects of the disclosure.

Like reference characters denote like elements throughout the text and figures.

DETAILED DESCRIPTION

Figure 1:
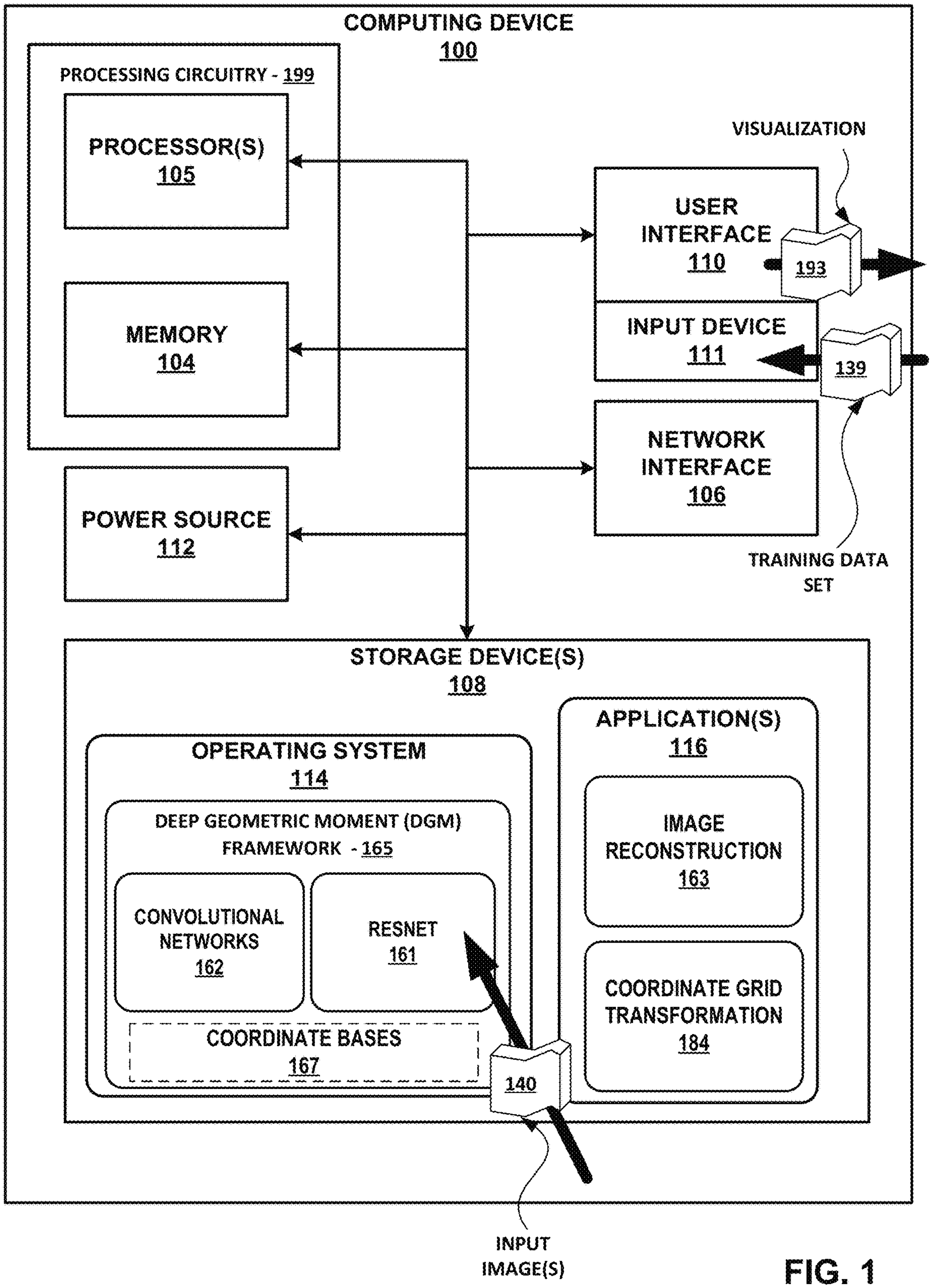
FIG. 1 is a block diagram illustrating further details of one example of computing device, in accordance with aspects of this disclosure.

Aspects of the disclosure provide improved shape awareness and interpretability in deep networks using geometric moments.

Deep networks for image classification may rely more on texture information than object shape. While efforts have been made to make deep-models shape-aware, it may be difficult to make such models simple, interpretable, or rooted in known mathematical definitions of shape. Described herein is a deep-learning model inspired by geometric moments, a classically well understood approach to measure shape-related properties. The described methodology utilizes a trainable network for generating coordinate bases and affine transformation parameters for making the features geometrically invariant yet in a task-specific manner. A Deep Geometric Moment framework (DGM framework) as described herein improves final interpretation of object features. Experiments demonstrate that the DGM framework is effective on standard image classification datasets and achieves higher classification performance compared to the baseline and standard Residual Network (ResNet) models while substantially improving interpretability.

Introduction

Advances in deep learning have resulted in state-of-the-art performance for a wide variety of computer vision tasks. The large quantity of training data and high computation resources have made convolutional neural networks (CNNs) into a common backbone model for many tasks, including image classification, object detection, segmentation, unsupervised learning, and generative modeling.

A Convolutional Neural Networks (CNN) consists of multiple spatially compact filters which convolve over an input image, followed by normalizations and nonlinearities. The small spatial extent and weight sharing properties of convolution kernels make them efficient and translation equivariant. However, the receptive field of convolution kernels may be limited due to its small spatial extent. The local nature of the convolution kernels prevents them from capturing the global context of the image.

Long-range dependency, e.g., a larger receptive field, may be achieved by stacking multiple CNN layers and reducing the spatial dimension using pooling operations. However, it has been observed that the features from this kind of architecture tend to be more receptive toward textures of objects rather than the shape of the objects. Prior known techniques have attempted to create better shape-biased datasets, such as Stylized-ImageNet. However, incorporating the shape bias more directly without changing training sets, as described herein, may improve performance.

Convolutional operations intrinsically represent frequency selective operations, while the shape is related to geometric concepts rather than specific frequency bands. Different types of operations that are more directly shape-sensitive may promote shape awareness. Vision tasks such as classification may be framed through the geometrical properties of the shape of an object. Rigid and non-rigid aspects of shape may be described in terms of geometric moments.

Geometric moments are a specific type of weighted averages of image pixel intensities, where the weights are drawn from specific polynomial-type basis functions. Such an operation may be expressed as a projection of the image on the bases. While classic theoretical development around moments used specific choices of the bases functions, application to difficult tasks such as image classification has remained limited.

The Deep Geometric Moment framework (DGM framework) described herein revisits moments in the context of a learnable spatial operation, introducing modules motivated by the image-projection analogy, in which bases are left to be learned end-to-end in a task-specific manner.

Geometric moments have a long history in the vision community for a wide variety of applications ranging from invariant pattern recognition, segmentation and 3D shape recognition. According to certain examples, the described DGM framework may extract invariant image moments for classification tasks. According to certain examples, the DGM framework architecture includes two streams of convolutional networks. One stream extracts features corresponding to the object, e.g., removes the background from the image. A second stream of the DGM framework learns the bases from a 2D coordinate grid. The DGM framework may compute geometric moments by projecting features of an input image onto the learned bases. In order to learn task-specific invariant moments to deformations, size, and location, the DGM framework may learn a simple transformation of coordinate grid and compute the geometric moments at multiple levels. In such a way, the geometric moment captures long-range dependency without the DGM framework using pooling layers or reducing the spatial dimension within the DGM framework. The computation cost of the geometric moment is linear in the spatial dimension.

In accordance with aspects of the disclosure, the DGM framework described herein provides at least the following improvements when compared with prior known techniques: First, the DGM framework generates discriminative features for the classification task by accounting for shape information through the use of deep geometric moments. Second, the DGM framework outperforms existing Residual Network (ResNet) models on standard datasets without using any pooling layer or reducing the spatial dimension. Third, the DGM framework provides easy access to interpretable features at any level by simple re-projection of moments. Fourth, the DGM framework may fine-tune the coordinate basis pipeline without retraining all the model parameters as is done by prior techniques.

While the DGM framework may not outperform all latest developments in vision, the described methodologies implemented by the DGM framework nevertheless perform comparably with standard models when trained from scratch, produce interpretable results, and is significantly easier to fine-tune.

FIG. 1 is a block diagram illustrating further details of one example of computing device, in accordance with aspects of this disclosure. FIG. 1 illustrates only one particular example of computing device 100. Many other example embodiments of computing device 100 may be used in other instances.

As shown in the specific example of FIG. 1, computing device 100 may include processing circuitry 199 including one or more processors 105 and memory 104. Computing device 100 may further include network interface 106, one or more storage devices 108, user interface 110, and power source 112. Computing device 100 may also include an operating system 114. Computing device 100, in one example, may further include one or more applications 116, such as image reconstruction 163 and coordinate grid transformation 184. One or more other applications 116 may also be executable by computing device 100. Components of computing device 100 may be interconnected (physically, communicatively, and/or operatively) for inter-component communications.

Operating system 114 may execute various functions including executing a trained AI model and performing AI model training. As shown here, operating system 114 executes a Deep Geometric Moment (DGM) framework 165 which includes both convolutional networks 161 and Residual Network (ResNet) 162 components. ResNet 161 may receive input image(s) 140 as input provided as new images or as training images within training dataset 139. DGM framework 165 further includes coordinate bases 167 which are calculated as part of the training process for the AI model to learn features of the input image(s) 140.

Computing device 100 may perform improved techniques for implementing improved shape awareness and interpretability in deep networks using geometric moments including performing AI model training using training image dataset 139 by extracting and learning image features from multiple input images 140 across a deep learning network with configurable depth to learn task-specific invariant moments ranging from deformations, sizes, and locations, to learn coordinate grid transformation 184 operations for a coordinate grid and to compute geometric moments at multiple levels. Computing device 100 may provide visualization 193 as output to a connected user device via user interface 110.

In some examples, processing circuitry including one or more processors 105, implements functionality and/or process instructions for execution within computing device 100. For example, one or more processors 105 may be capable of processing instructions stored in memory 104 and/or instructions stored on one or more storage devices 108.

Memory 104, in one example, may store information within computing device 100 during operation. Memory 104, in some examples, may represent a computer-readable storage medium. In some examples, memory 104 may be a temporary memory, meaning that a primary purpose of memory 104 may not be long-term storage. Memory 104, in some examples, may be described as a volatile memory, meaning that memory 104 may not maintain stored contents when computing device 100 is turned off. Examples of volatile memories may include random access memories (RAM), dynamic random-access memories (DRAM), static random-access memories (SRAM), and other forms of volatile memories. In some examples, memory 104 may be used to store program instructions for execution by one or more processors 105. Memory 104, in one example, may be used by software or applications running on computing device 100 (e.g., one or more applications 116) to temporarily store data and/or instructions during program execution.

One or more storage devices 108, in some examples, may also include one or more computer-readable storage media. One or more storage devices 108 may be configured to store larger amounts of information than memory 104. One or more storage devices 108 may further be configured for long-term storage of information. In some examples, one or more storage devices 108 may include non-volatile storage elements. Examples of such non-volatile storage elements may include magnetic hard disks, optical discs, floppy disks, Flash memories, or forms of electrically programmable memories (EPROM) or electrically erasable and programmable (EEPROM) memories.

Computing device 100, in some examples, may also include a network interface 106. Computing device 100, in such examples, may use network interface 106 to communicate with external devices via one or more networks, such as one or more wired or wireless networks. Network interface 106 may be a network interface card, such as an Ethernet card, an optical transceiver, a radio frequency transceiver, a cellular transceiver or cellular radio, or any other type of device that can send and receive information. Other examples of such network interfaces may include BLUETOOTH®, 3G, 4G, 1G, LTE, and WI-FI® radios in mobile computing devices as well as USB. In some examples, computing device 100 may use network interface 106 to wirelessly communicate with an external device such as a server, mobile phone, or other networked computing device.

User interface 110 may include one or more input devices 111, such as a touch-sensitive display. Input device 111, in some examples, may be configured to receive input from a user through tactile, electromagnetic, audio, and/or video feedback. Examples of input device 111 may include a touch-sensitive display, mouse, keyboard, voice responsive system, video camera, microphone or any other type of device for detecting gestures by a user. In some examples, a touch-sensitive display may include a presence-sensitive screen.

User interface 110 may also include one or more output devices, such as a display screen of a computing device or a touch-sensitive display, including a touch-sensitive display of a mobile computing device. One or more output devices, in some examples, may be configured to provide output to a user using tactile, audio, or video stimuli. One or more output devices, in one example, may include a display, sound card, a video graphics adapter card, or any other type of device for converting a signal into an appropriate form understandable to humans or machines. Additional examples of one or more output devices may include a speaker, a cathode ray tube (CRT) monitor, a liquid crystal display (LCD), or any other type of device that can generate intelligible output to a user.

Computing device 100, in some examples, may include power source 112, which may be rechargeable and provide power to computing device 100. Power source 112, in some examples, may be a battery made from nickel-cadmium, lithium-ion, or other suitable material.

Examples of computing device 100 may include operating system 114. Operating system 114 may be stored in one or more storage devices 108 and may control the operation of components of computing device 100. For example, operating system 114 may facilitate the interaction of one or more applications 116 with hardware components of computing device 100.

Figure 2A:
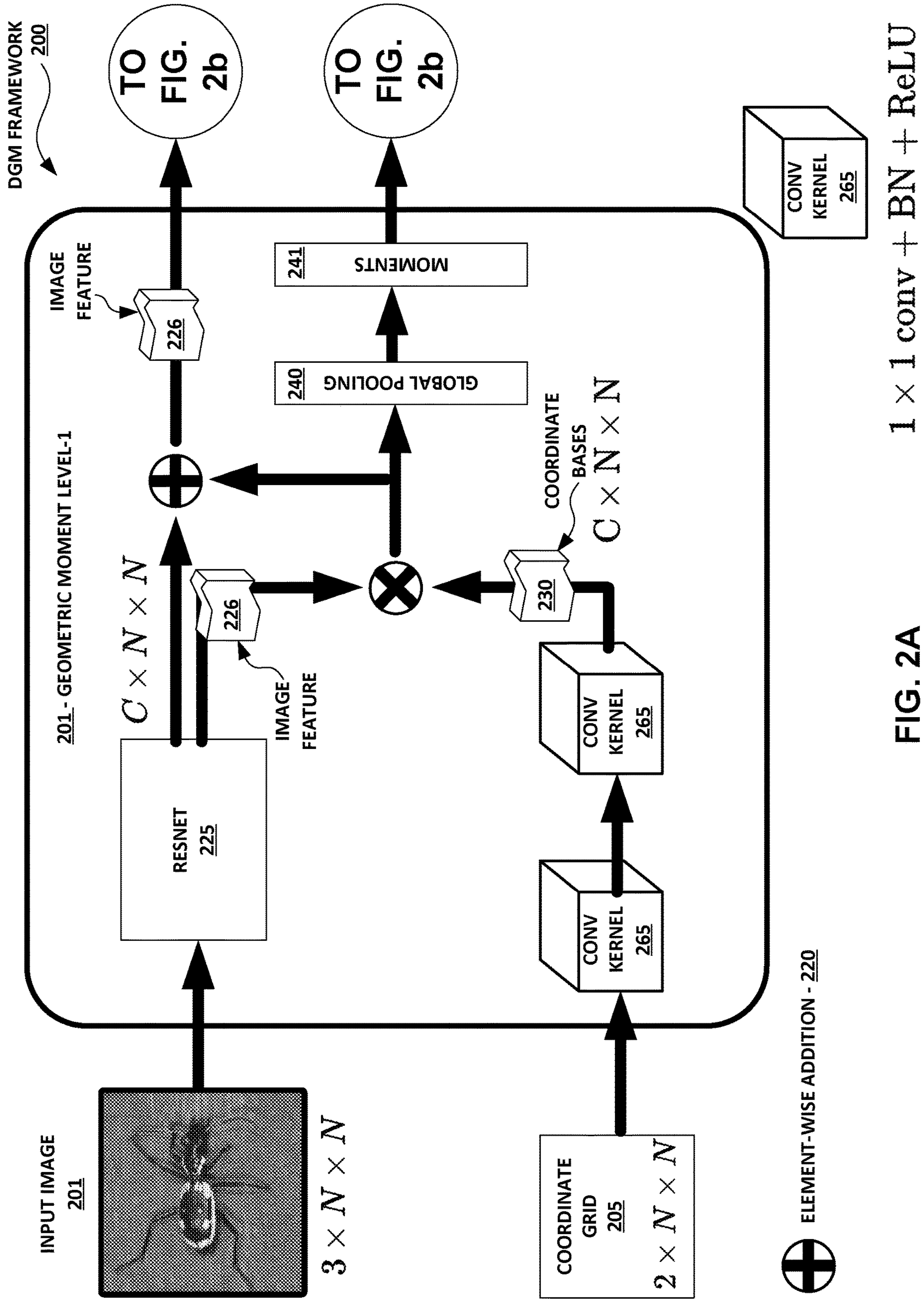
FIGS. 2A and 2B depict Deep Geometric Moment framework (DGM framework) enabling image classification tasks, in accordance with aspects of the disclosure.
Figure 2B:
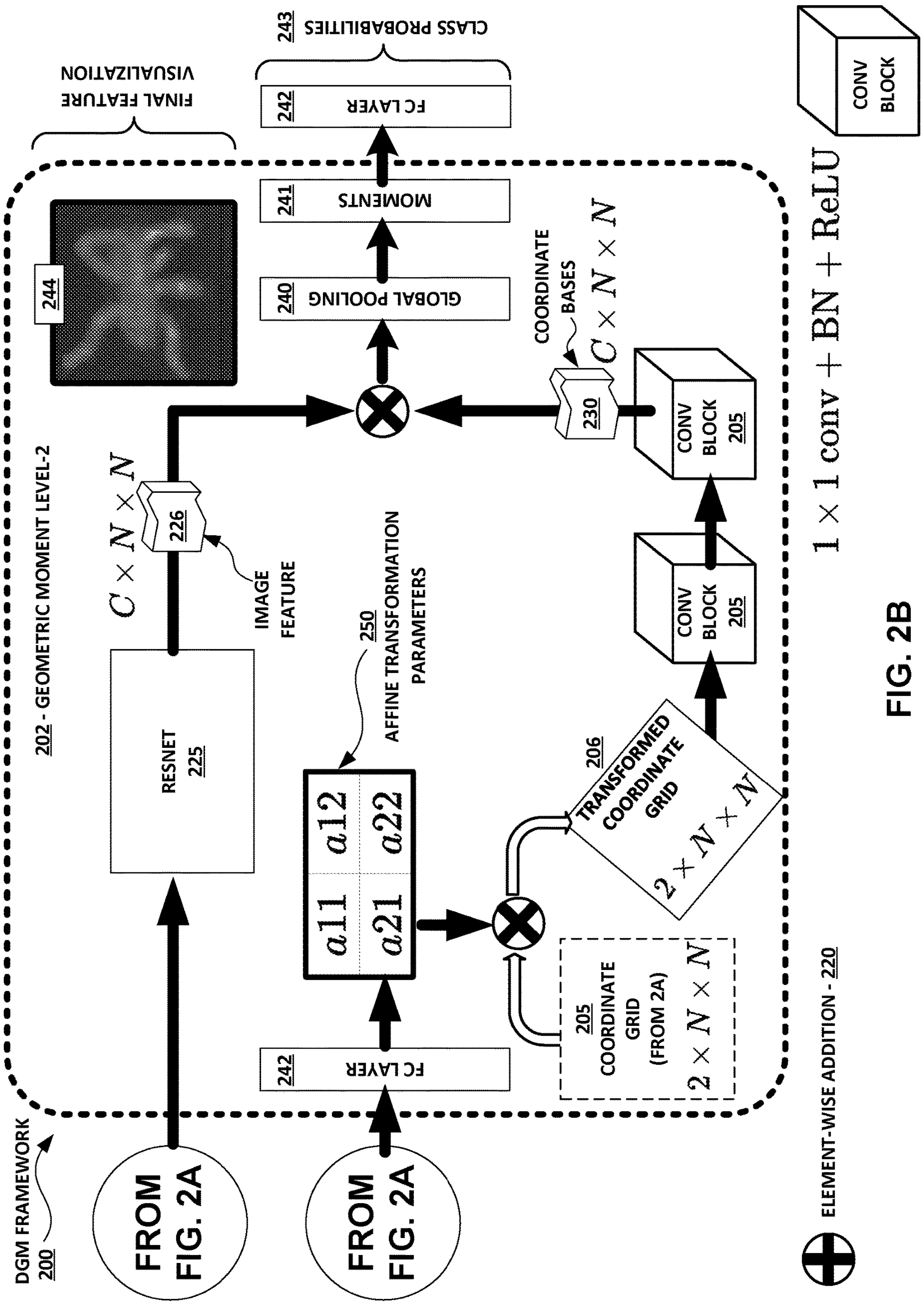

FIGS. 2A and 2B depict Deep Geometric Moment framework (DGM framework) 200 enabling image classification tasks, in accordance with aspects of the disclosure.

As shown here, DGM framework 200 includes two blocks for image classification task processing. In particular, FIG. 2A depicts Geometric moment Level-1 201 and continues onto FIG. 2B which depicts geometric moment Level-2 202. Geometric moments Level-1 and Level-2 (201 and 202) are collectively formed from two pipelines. In particular, the top portion of FIGS. 2A and 2B depict a CNN based image feature 226 extraction. The bottom portion of FIGS. 2A and 2B depict computation of coordinate bases 230.

Geometric moment Level-2 202 may be repeated a number of times for computing moments 241, similar to depth concept computations in deep networks. A moment 241 for a given two-dimensional piecewise continuous function $f(x, y)$ is defined according to Equation 1, set forth below, as follows:

$$m_{pq} = \int_{-\infty}^{\infty}\int_{-\infty}^{\infty} x^p y^q f(x, y)dxdy,$$

where, (x, y) is the 2D coordinate and (p+q) is the order of the moment 241. By uniqueness theorem, if $f(x, y)$ is a piecewise bounded continuous function (e.g., it is non-zero only on a compact part of the xy plane), then moment 241 sequence $m_{pq}$ is uniquely defined for all orders (p+q) by $f(x, y)$. Conversely, $f(x, y)$ is uniquely determined by the sequence $m_{pq}$.

Equivalently, moments 241 may also be seen as a 'projection' of the 2D function on certain bases of the form $x^p y^q$. Instead of using the bases function of type $x^p y^q$, one may instead also use orthogonal functions such as Legendre or Zernike type polynomials for better reconstruction. Image moments 241 provide invariant shape descriptors enjoying a long history of use in the computer vision literature to capture the geometrical properties of an image. For example, $m_{00}$ ($0^{th}$ order) represents average pixel intensity, $m_{10}$ ($1^{st}$ order) and $m_{01}$ ($1^{st}$ order) represents xy centroid coordinates and the combination of $1^{st}$ and $2^{nd}$ order may be used to compute orientation.

DGM framework 200 may receive discriminative moments 241 as input, which are also invariant to certain image transformations such as rotation, translation, and scale for the image classification task. Various techniques to find invariant moments 241 for input images 201 may be utilized. For instance, one technique to find moments 241 include use of seven moments 241, mostly a combination of lower-order moments 241 invariant under scaling, translation, and rotation. While these basic sets of seven moments 241 are provably invariant to rotation, translation, and scale, their use has been limited since their discriminative power is not sufficiently high. Developing invariant moments 241 for the Legendre and Zernike type polynomials for any arbitrary order is also possible. However, such techniques similarly do not significantly impact contemporary image classification tasks.

In accordance with aspects of the disclosure, DGM framework 200 provides an improved approach for defining spatial operations for image classification networks having a structure motivated by classic moment 241 computation but for which basis functions are left to be learned end-to-end by a deep learning network in a task-specific way. This implies that DGM framework 200 does not seek to replicate any of the classical moments 241 in an exact sense but instead, DGM framework 200 uses alternative means to fuse moment-like computations and enables networks to learn the suitable basis functions for a given task. Such an approach is described in greater detail below.

Geometric Moments 241 and Deep Networks:

Prior techniques for integrating geometric moments 241 with deep networks have been developed, including techniques specifically applied to 3D shape classification from point-cloud data. For example, geodesic moment-based features from an auto-encoder may be used to classify 3D shapes. On the other hand, CNNs were used as a polynomial function to learn bases, and affine transformation parameters 250 for 3D point cloud data based shape classification. Such techniques were further extended using a graph CNN to capture local features of the 3D object. More recent techniques have replaced conventional global average pooling in CNN models with invariant Zernike moment-based pooling for image classification tasks.

Distinct from prior methods, DGM framework 200 learns bases as well as affine transformation parameters 250. DGM framework 200 is readily differentiated from prior approaches for at least the following reasons. First, DGM framework 200 may optimize for natural image classification where moment 241 computation is challenging compared to 3D shape classification, due to intensity variation, background variation, occlusions, etc. Second, architecturally, DGM framework 200 is more involved compared to processing 3D objects that are specified directly in terms of coordinate locations. In some examples, a Spatial Transformer Network (STN) of DGM framework 200 predicts affine transformation parameters 250 for classifying images that improve maximizing object detection accuracy and transform the 2D CNN feature grid accordingly. The spatial transformation of the feature grid may operate as an attention module providing invariance to rotation, translation, scale, and different warping of the image data.

Prior techniques utilized spatially deformable convolution and pooling kernels to bring invariance under spatial transform. Recently, exotic techniques such as rotationally invariant convolution and regularization loss have emerged to incorporate invariance towards spatial transformations. However, DGM framework 200 does not transform the CNN feature grid and instead, DGM framework 200 utilizes a 2D coordinate grid 205 that is much simpler in terms of computation and implementation.

Deep geometric moments 241 CNNs are extremely good at capturing local context and texture information to discriminate images, even in a complex classification task, without an explicit 'shape' related operation. Conversely, geometric moments 241 capture the shape information well and provide discriminative cues in classifying images. However, discrimination power of such geometric moments 241 is quite limited and generally consumes as input, a salient object over a homogeneous background. In accordance with aspects of the disclosure, DGM framework 200 blends the strengths from both approaches.

In accordance with aspects of the disclosure, a deep geometric moment (DGM) model (DGM model) is applied by DGM framework 200 utilizing geometric moments 241 along with CNNs to perform classification by providing both shape and texture access. The geometric moment 241 for a discrete 2D function may be given by the discrete version of Equation 2, set forth below, as follows:

$$m_{pq} = \sum_x \sum_y x^p y^q I(x, y).$$

Traditional usage of moments 241 in vision, the number and order of moments 241 is an experimental design configuration. Selecting the right number and order of moments 241 depends on the underlying tasks. Large moments 241 are useful for image reconstruction, whereas higher-order moments 241 for image classification may be negatively affected by noise and hence not very useful. Thus, selecting the correct moment 241 orders may improve performance.

Utilizing DGM framework 200, a number of moments 241 (in terms of feature dimension) may be specified, but the exact basis functions and orders are learned end-to-end, by the networks of DGM framework 200 for specific tasks. The subscript notation pq may therefore be dropped in favor of using superscript notation c, indicating the feature channel number for moment m (241). DGM framework 200 may utilize CNNs to extract relevant object features from the given images and project them onto the learned coordinate bases 230 per channel, according to Equation 3, set forth below, as follows:

$$m^c = \frac{1}{N \times N} \sum_x \sum_y g^c(x, y) f^c(x, y),$$

where, N×N is the dimension of input image 201, where the term $g^c(x, y)$ is a learnable 2D polynomial function, and where the term $f^c(x, y)$ represents image feature 226 at coordinate location (x, y), and where the term c refers to the channel dimension of the feature, given by the CNN from the image-feature stream (refer again to the feature extraction stream in the upper portion of FIGS. 2A and 2B). Next, to account for varying locations, sizes, poses, and deformation, DGM framework 200 may learn affine transformation parameters 250 to appropriately deform the 2D coordinate grid 205 during computation of moment 241.

In accordance with certain examples, DGM framework 200 includes the following three components:

Coordinate Base Computation:

First, DGM framework 200 may utilize a 2D coordinate grid 205 as input to generate the bases via coordinate base computation operations.

Image Feature Computation:

Second, DGM framework 200 may obtain image features 226 using ResNets 225 via image feature computation operations.

Affine Transform Estimation:

Third, DGM framework 200 may transform the 2D coordinate grid 205 into transformed coordinate grid 206 via affine transform estimation operations to enable invariance learning.

According to aspects of the disclosure, the architecture of DGM framework 200 as depicted by FIGS. 2A and 2B consists of Geometric moment Level-1 201 (see FIG. 2A) and Geometric moment Level-2 202 (see FIG. 2B). According to certain examples, Geometric moment Level-1 201 is fixed, whereas geometric moment Level-2 202 may be replicated multiple times to create deeper networks.

Functional Overview of DGM Framework 200:

Coordinate Base Computation:

For computing bases, expressed as g(x, y) in Equation 3, a 2D coordinate grid 205 may be used as an input. The 2D coordinate grid 205 is represented by 2×N×N, where N×N is the dimension of input image 201. Each entry in coordinate grid 205 indicates the normalized 2D pixel locations ($x, y \in [0,1]^2$).

The term g(x, y) in Equation 3 is defined by a neural network that consists of two layers of a 1×1 convolution layer followed by a batch-normalization and ReLU layer. This definition of g(x, y) processes each location of coordinate grid 205 independently. For the experiments, DGM framework 200 utilized two convolution layers, but more layers could be included to learn more complex or higher-order moments 241. The output bases are of dimension C×N×N where C is the number of moments 241 (e.g., number of channels).

Image Feature 226 Computation:

Referring back to the term $f(x, y)$ in Equation 3, also depicted at FIG. 2A is Residual Network (ResNet) 225 which takes as input, the image of dimension 3×N×N, and outputs a feature of dimension C×N×N which is passed through element-wise addition 220 and onto ResNet 225 at FIG. 2B. The function, $f(x, y)$ may be implemented via ResNet 225 with 3×3 filter convolution kernel 265.

Geometric moments 241 may be insufficient for capturing local features in the input image 201. Conversely, CNNs with convolution kernel 265 size of 3×3 or greater are very efficient in capturing local properties. Experiments therefore utilized convolution kernel 265 of size 3×3 in ResNets 225.

In some examples, DGM framework 200 takes image features 226 from ResNet 225 and projects them onto the bases by performing element-wise multiplication 221. DGM framework 200 obtains moments 241 by using global pooling 240 on the projected features. DGM framework 200 differs from the conventional definition of geometric moment 241 as set forth by Equation 1. Specifically, prior known techniques project the same 2D image onto each basis, whereas DGM framework 200 projects different feature maps to each basis. The projected feature map on the bases highlights the important region in the feature map.

AFFINE TRANSFORMATION ESTIMATION:

For the experiments, a canonical coordinate grid 205 was used to compute moments 241 and predict affine transformation parameters 250 using moments 241. The prediction network consisted of two fully-connected layers (FC layers) 242 with a non-linear activation. The prediction network obtains the canonical moments 241 (1×C) as input and outputs affine transformation parameters 250 (C×6) for each feature channel. Then, 2D coordinate grid 205 Cc was transformed into transformed coordinate grid 206 using element-wise multiplication 221 according to:

$$C'_G = \begin{bmatrix} a_{11} & a_{12} \\ a_{21} & a_{22} \end{bmatrix} \times C_G + \begin{bmatrix} t_x \\ t_y \end{bmatrix},$$

where, the 2×2 matrix represents predicted affine transformation parameters 250, where the terms $t_x$ and $t_y$ are the predicted translation parameters, and where the term $C'_G$ represents the 2D transformed coordinate grid 206.

Transformed coordinate grids 206 may be utilized to generate new bases and compute new moments 241 for each channel. Arguably, affine transformation parameters 250 are also limited in providing improved invariance and robustness, but this configuration was demonstrated to be efficient and leads to good performance.

The DGM classification model implemented by DGM framework 200 for the image classification task is depicted at FIG. 2B resulting in generated class probabilities 243. DGM framework 200 uses computed coordinate bases 230, convolution network-based features, and estimated affine transformation parameters 250 and the networks of DGM framework 200 are trained end-to-end.

According to aspects of the disclosure, DGM framework 200 includes functionality enabling at least the following: First, DGM framework 200 enables an image feature 226 pipeline that transforms an input image 201 into image features 226 features through ResNet 225 blocks. Second, DGM framework 200 enables a geometric moment 241 pipeline that generates coordinate bases 230 and computes affine transformation parameters 250 and moments 241. According to such an example, DGM framework 200 does not use a pooling layer nor does DGM framework 200 reduce the spatial dimensions across the networks. Absence of pooling layer operations and absence of the reduction of spatial dimensions operations improves preservation of the shape of the object within final feature visualization 244. Conversely, techniques which apply pooling and/or reducing the spatial dimension are likely to distort the final reconstructed shape, limiting its interpretability.

For simplicity, the same number of feature channels may be used in each ResNet 225 layer. As shown in FIG. 2A, Geometric moment Level-1 201 uses the canonical coordinate grid 205 to generate bases and ResNet 225 to generate features from the image. DGM framework 200 then projects this feature onto the bases to compute moments 241. The projected feature acts as an attention map and is added to the original feature. This feature map and geometric moments 241 are then passed to geometric moment Level-2 202 as depicted at FIG. 2B.

Geometric moment Level-2 202 contains another ResNet 225 to process the features further. Geometric moment Level-2 202 also predicts affine transformation parameters 250 based on moments 241 from Geometric moment Level-1 201 and transforms coordinate grid 205 to regenerate coordinate bases 230.

While FIG. 2B depicts only a single geometric moment Level-2 202, DGM framework 200 may be configured to repeat geometric moment Level-2 202 multiple times for added depth.

Moments 241 from the final level of geometric moment Level-2 202 are used as input to the fully-connected layer (FC Layer) 242 to generate class probabilities 243 for the classification task.

Feature Visualization:

To visualize the shape awareness brought by the DGM approach, learned features are depicted that highlight the object's shape. By the uniqueness theorem, moments 241 may be used to reconstruct original input image 201, provided the bases are complete. DGM framework 200 may learn that bases are under-complete. Using moments 241 as combination weights on the projected features given by Equation 4, set forth below, as follows:

$$V = \sum_c m^c (G^c \otimes F^c),$$

where, $m^c$ is the moment 241, $G^c$ is the basis, $F^c$ is image feature 226 for channel c, and ⊗ is element-wise multiplication 221, a visualization of shape-related information in the features is obtained.

Figure 3A:
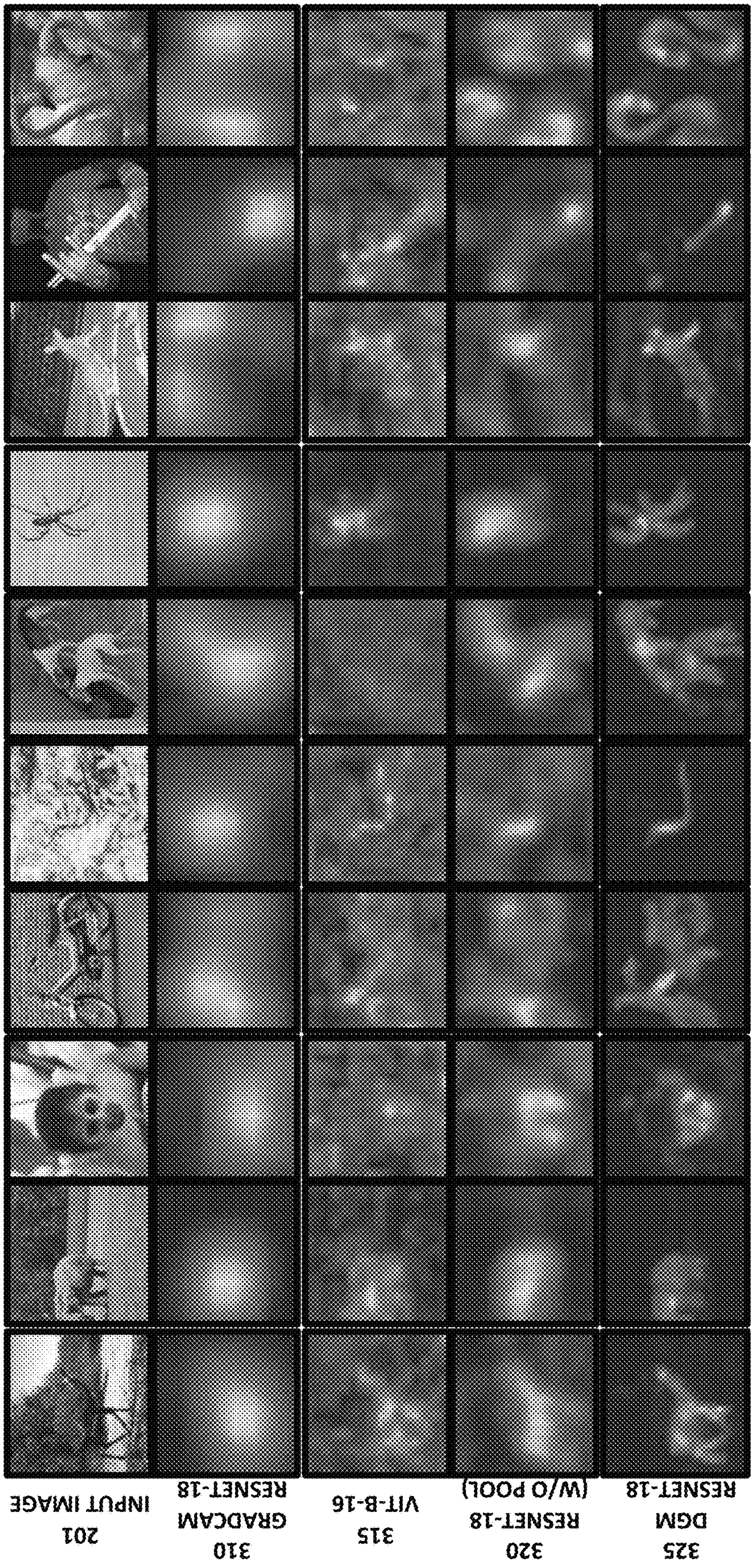
FIG. 3A. depicts feature visualizations of different models on ImageNet, in accordance with aspects of the disclosure.

FIG. 3A. depicts feature visualizations of different models on ImageNet, in accordance with aspects of the disclosure. Visualizations derived from DGM framework 200 are compared with the Vision Transformer (ViT-B-16) attention map. Notably, DGM framework 200 produces a very sharp object shape. Depicted within the table of images are input images 201 at the top row, GradCam ResNet-18 310 results in the second row, VIT-B-16 315 results in the third row, ResNet-18 320 (without pooling) results in the fourth row, and DGM ResNet-18 326 results attained by DGM framework 200 in the bottom row.

Figure 3B:
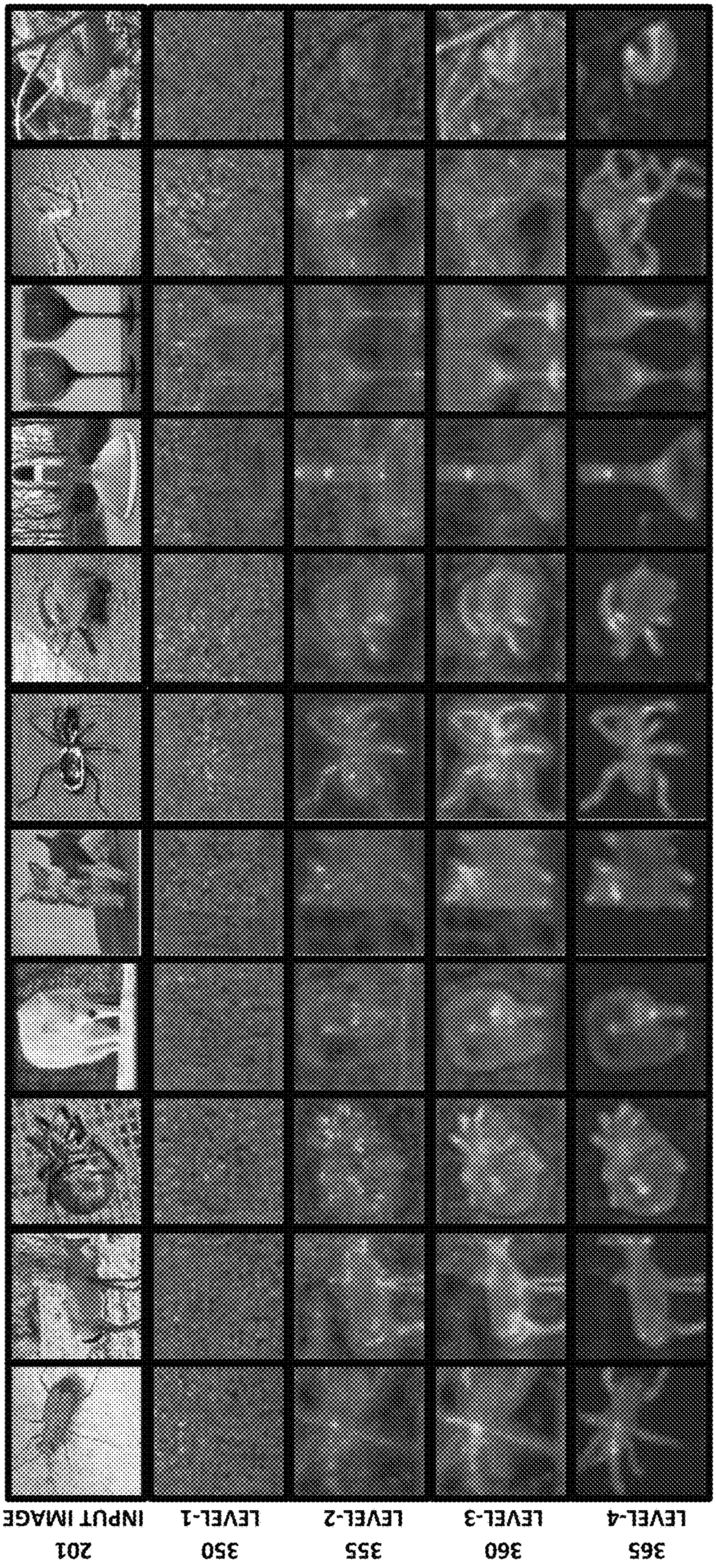
FIG. 3B depicts a visualization at different levels for the DGM ResNet-34 model on the ImageNet dataset, in accordance with aspects of the disclosure.

FIG. 3B depicts a visualization at different levels for the DGM ResNet-34 model on the ImageNet dataset, in accordance with aspects of the disclosure. At higher levels, DGM framework 200 successfully separates background information from the shape of each object when compared to initial levels. Depicted within the table of images are input images 201 at the top row, Level-1 results 350 in the second row, Level-2 results 355 in the second row, Level-3 results 360 in the third row, and Level-4 results 365 in the bottom row.

Feature Visualization:

One advantage of DGM framework 200 keeping a higher spatial dimension of features is interpretability at different levels. The feature vectors may be easily visualized by a reconstruction step as given by Equation 4, noted above.

With reference again to FIG. 3A, the table of images compares Level-4 visualization by GradCam ResNet-18 310 as a heatmap for a few randomly selected input images 201 from the ImageNet dataset using DGM framework 200 against baseline GradCam ResNet-18 310 and standard ResNet VIT-B-16 315 models.

The visualization for the baseline GradCam ResNet-18 310 model is a weighted sum of the final convolutional layer activation based on the global feature. GradCam ResNet-18 310 was utilized for the standard ResNet model and visualizations were derived using DGM framework 200 and compared with the current attention-based Vision Transformer VIT-B-16 315 model, which was pre-trained on the ImageNet-21K and fine-tuned on ImageNet-1K datasets.

As shown in FIG. 3A, GradCam ResNet-18 310 visualizations using a standard ResNet-18 model generate images having a blob-like shape around a critical region of corresponding input image 201, with no discernible object shape. While shape fidelity improves with use of VIT-B-16 315 model, the heatmaps images from VIT-B-16 315 model remain diffuse, and the resulting shapes are not very distinct. However, with DGM framework 200, object shapes are crisp, with improved classification accuracy. Also, DGM framework 200 heat maps are much sharper than the vision transformer attention map (Vit-B-16 315). Additionally, in DGM framework 200, features may be visualized at different levels providing much better-debugging capability, as shown in FIG. 3B. At initial levels, the heatmap is noisy, as may be observed in the second row Level-1 350 images. As depicted, DGM framework 200 heat maps may not adequately separate the object from the background clearly. However, DGM framework 200 heat maps at higher levels progressively improve shape discernibility, with less noise and some object discernibility at Level-2 355, increasing object discernibility at Level-3 360, and very little noise and very good object discernibility at Level-4 365.

Experimental Results

FIG. 4 depicts Table 1 at element 401 providing a performance comparison of DGM framework 200 with increasing levels on CIFAR datasets, in accordance with aspects of the disclosure.

In particular, Table 1 (401) reports classification performance of the model applied by DGM framework 200 and the number of parameters as the number of levels are increased within the model.

Experiments were performed to validate the effectiveness of DGM framework 200 for image classification on standard datasets: CIFAR-10 (415), CIFAR-100 (420), and ILSVRC-2012 ImageNet. Performance of DGM framework 200 was compared to a baseline model (ResNet 225 model without pooling layers) and standard ResNet 225 models across classification accuracy (in %) and the number of parameters (in Million M). Along with the classification performance, feature reconstruction and semantic segmentation was compared qualitatively. The experiments trained all models under the same training hyperparameters. For CIFAR (415, 420) datasets, the experiments trained models up to 150 epochs with a batch size of 128. ImageNet, was trained for 100 epochs with a batch size of 256. The experiments used SGD optimizer with momentum=0.9, weight decay=5e$^{-4}$, and cosine learning rate decay with an initial learning rate of 0.1.

Levels Needed:

Experiments conducted answered the question: "How many levels are needed?" In the experiment, ResNet 225 with image feature 226 pipeline consisted of only 1×1 filter convolution kernels 265, except for the first convolutional layer. There was no interaction between neighboring pixels in this setting. The only interaction was through geometric moments 241 and affine transformation of coordinate grid 205.

With reference again to FIGS. 2A and 2B, for the experiments, each level of DGM framework 200 was configured with one ResNet 225 block, two ResNet layers, a generator for coordinate bases 230 defined with two convolutional layers, and two fully-connected layers (FC layers) 242 for prediction of affine transformation parameters 250. The settings enabled understanding of the overall contributions of coordinate bases 230 and affine transformation parameters 250.

With reference again to Table 1 (401) of FIG. 4, in DGM Level-1 451, a canonical coordinate grid 205 generated the bases. The results show that DGM Level-2 452 performed significantly better than DGM Level-1 451 on both the CIFAR-10 (415) and CIFAR-100 (420) datasets.

The performance improvement reflects the effectiveness of transforming coordinate grid 205 to regenerate better coordinate bases 230. A performance difference between the DGM Level-3 453 and DGM Level-4 454 models was observed to be minimal. In DGM Level-4 455 w/o affine transform (last row), processing did not transform coordinate grid 205; hence coordinate bases 230 for Level-4 455 w/o affine transform, remained the same for every input image 201. Without affine transformation, performance of Level-4 455 w/o affine transform model drops, indicating the effectiveness of using affine transformation. Also, increasing the levels of the model beyond Level-4 454 does not significantly improve the classification performance but is accompanied by a large increase in the number of parameters and computation; hence, only DGM Level-4 454 models were utilized for the experiments.

FIG. 5 depicts Table 2 at element 501, providing a performance comparison of DGM ResNet-18 535 and DGM ResNet-34 545 models implemented by DGM framework 200 and baseline ResNet models (ResNet-18 530 and ResNet-34 540 models without pooling layers) on CIFAR datasets 515 and 520, in accordance with aspects of the disclosure.

Comparison with Baseline ResNet Model:

The baseline model in this experiment was constructed in the same manner as DGM framework 200 but without projection onto coordinate bases 230. The baseline models (ResNet-18 530 and ResNet-34 540) are similar to standard ResNet models without pooling layers or reducing the spatial dimension. Without the reduction in the feature's spatial dimension, the receptive field of the filter convolution kernel 265 reduces and hence weakens the long-range dependency captured by the model. This experiment helped to establish that moments 241 effectively capture long-range dependency without reducing the spatial dimension of the features. Global pooling 240 may be utilized on the features from the last ResNet layer of the baseline model to get the final feature vector for classification.

In Table 2 (501), the baseline ResNet-18 530 and ResNet-34 540 models are based on the standard ResNet models with a constant number of feature channels (e.g., 256 channels for this experiment) in every layer and without any pooling layers or reducing the spatial dimensions. DGM ResNet-18 535 and DGM ResNet-34 545 models are also of 4 levels, with coordinate grid 205 size of 32×32.

Table 2 shows that DGM framework 200 models (DGM ResNet-18 535 and DGM ResNet-34 545) performed much better than the baseline models (ResNet-18 530 and ResNet-34 540) on both CIFAR (515, 520) datasets. The performance improvement validates the effectiveness of using coordinate bases 230 pipeline.

FIG. 6 depicts Table 3 at element 601, providing a performance comparison of DGM framework 200 models DGM ResNet-18 635 and DGM ResNet-34 645 with baseline ResNet models (ResNet-18 630 and ResNet-34 640 models without pooling layers) on the ImageNet dataset, in accordance with aspects of the disclosure.

For comparison on the ImageNet dataset, ResNet-18 and ResNet-34 type architectures were utilized on a grid size of 32×32. Processing divided the 256×256 image into 8×8 patches utilizing a linear embedding layer similar to Vision Transformer (ViT) to reduce the spatial dimension to 32×32, followed by processing through DGM framework 200. For the embedding layer, a convolution layer with 8×8 convolution kernels 265 and stride of 8 was used. Both baseline models (ResNet-18 630 and ResNet-34 640) and DGM ResNet-18 635 and DGM ResNet-34 645 models consisted of 3×3 filter convolution kernels (element 265) and 256 feature channels and were trained under the same hyperparameters. Table 3 (601) shows that DGM framework 200 provides an improvement of ~4% (in the case of DGM ResNet-18 635) over the baseline ResNet-18 630 model with the same feature extraction pipeline. The performance of baseline models ResNet-18 630 and ResNet-34 640 was less than the standard ResNet models. This performance reduction in the baseline models may be due to a lack of pooling layers or reduction in features' spatial dimension, which results in a low receptive field. Performance of DGM ResNet-18 635 and DGM ResNet-34 645 models was comparable to the standard ResNet model but without a spatial dimension reduction, showing that moments 241 effectively capture long-range dependencies.

FIG. 7A depicts Table 4 at element 701 providing performance improvement results of DGM models DGM ResNet-18 735, DGM ResNet-34 745, and DGM MobileNet 765 over standard ResNet models (with pooling layers) on CIFAR datasets, in accordance with aspects of the disclosure.

FIG. 7B depicts Table 5 at element 702 providing a performance comparison of DGM models DGM ResNet-18 735, DGM ResNet-34 745, DGM ResNet-50 755, and DGM MobileNet 765 with standard ResNet model (with pooling layers) on ImageNet dataset, in accordance with aspects of the disclosure.

Comparison with Standard ResNet Model:

Table 4 (701 at FIG. 7A) and Table 5 (702 at FIG. 7B) compare DGM framework 200 models with conventional ResNet models. The number of feature channels in the standard ResNet model is (64,128,256,512). The number of feature channels in DGM framework 200 models is 256 in DGM ResNet-18 735, DGM ResNet-34 745 and 512 feature channels in DGM ResNet-50 755 across all levels. Naming of DGM framework 200 models DGM ResNet-18 735, DGM ResNet-34 745, DGM ResNet-50 755, and DGM MobileNet 765 was based on the number of layers used in image feature 226 pipeline. Similarly, naming of the standard ResNet models ResNet-18 730, ResNet-34 740, ResNet-50 750, and MobileNet 760 was based on the number of layers used in each respective standard ResNet model. The standard ResNet models use pooling layers to reduce the spatial dimensions up to 8×8 in the final layer, whereas, in the DGM models implemented by DGM framework 200, the final feature's spatial dimension is 32×32.

Table 4 (701 at FIG. 7A) shows that DGM framework 200 models perform better than the standard ResNet models on both CIFAR-10 and CIFAR-100 datasets. DGM framework 200 models improves the accuracy of ~1% on CIFAR-10 and ~3% on CIFAR-100.

Table 5 (702 at FIG. 7B) compares DGM framework 200 models with the standard ResNet model on the ImageNet dataset. DGM framework 200 models were observed to be better than the standard ResNet models while using a similar number of parameters but without using any pooling layers. The computation cost for DGM framework 200 models may be higher than conventional ResNet models, which is attributable to the fact that DGM framework 200 models do not reduce the spatial dimension of image features 226. However, one may reduce the computational costs of the DGM models within the image pipeline using the channel-wise convolution.

In Table 4 (701 at FIG. 7A) and Table 5 (702 at FIG. 7B), DGM MobileNet 765 has few parameters, but performs comparable to DGM framework 200 models with conventional ResNet layers.

FIG. 8 depicts Table 6 at element 801 providing classification performance results on fine-tuning of pre-trained ImageNet models DGM ResNet-18 835, DGM ResNet-34 845, and DGM MobileNet 865 on CIFAR datasets, in accordance with aspects of the disclosure.

Fine-Tuning:

For DGM fine-tuning, DGM framework 200 may retrain only the coordinate bases pipeline and the final classifier layer, while freezing an image feature extraction pipeline. Coordinate bases pipeline may contain significantly fewer parameters and consume less computation. For the experiments, an ImageNet pretrained DGM model was fine-tuned for only 30 epochs on CIFAR-10 and CIFAR-100 datasets. The network was fine-tuned using a SGD optimizer with a cosine decay learning rate and an initial learning rate of 0.01.

Table 6 (801) shows the accuracy of the fine-tuned models DGM ResNet-18 835, DGM ResNet-34 845, and DGM MobileNet 865 on the CIFAR-10 and CIFAR-100 datasets. The performance of the fine-tuned models drop when compared to a DGM model trained from scratch, but performs equally well to the standard ResNet model trained from scratch.

Figure 9:
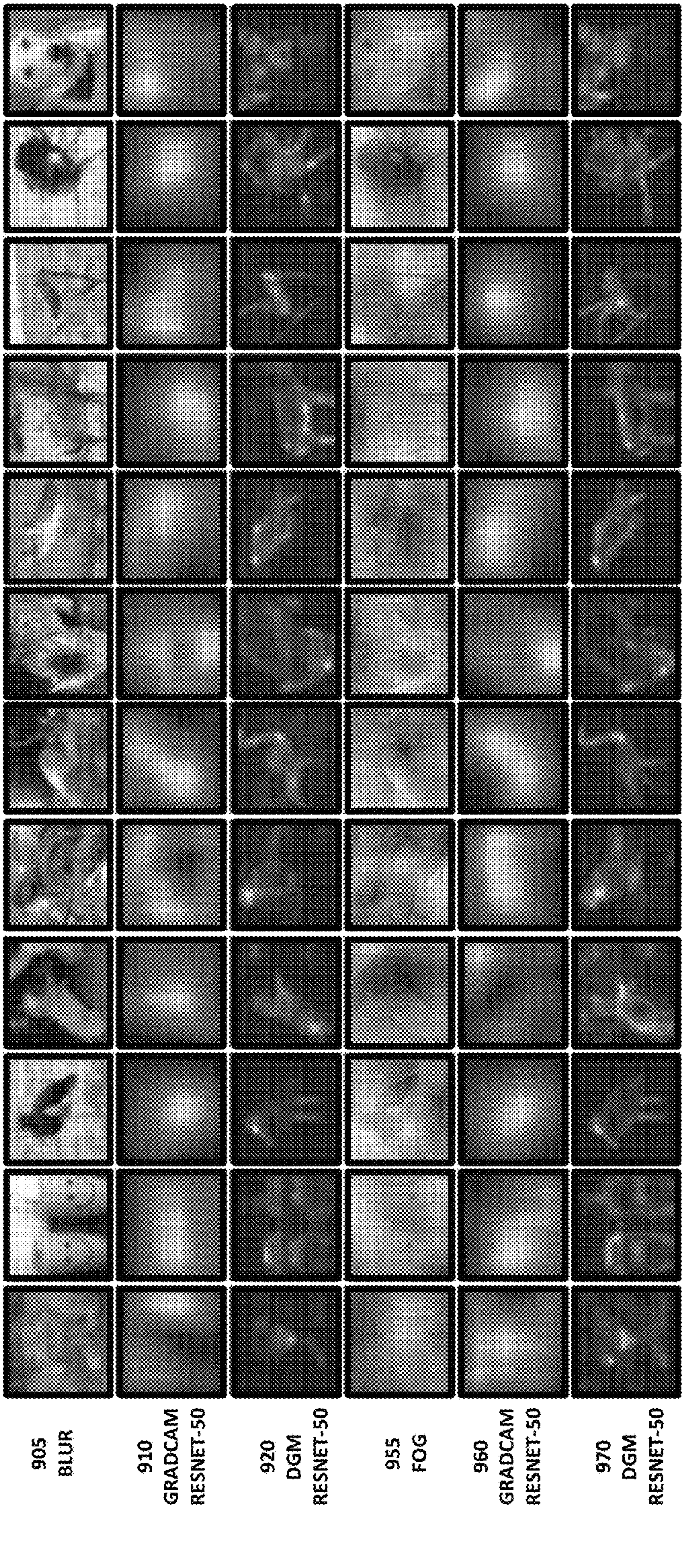
FIG. 9 depicts visualizations from DGM and standard ResNet models under two different color distortions including blur ($1^{st}$ row) and fog ($4^{th}$ row) from the ImageNet-C dataset, in accordance with aspects of the disclosure.

FIG. 9 depicts visualizations from DGM and standard ResNet models under two different color distortions including blur 905 ($1^{st}$ row) and fog 955 (4th row) from the ImageNet-C dataset, in accordance with aspects of the disclosure.

Applying DGM framework 200 models DGM ResNet-50 920, 970 to the blur 905 ($1^{st}$ row) and fog 955 ($3^{rd}$ row) images, produces consistent shapes ($3^{rd}$ and 6th rows) across different distortions compared to the resulting images from standard ResNet models GradCam ResNet-50 910, 960 (in the $2^{nd}$ and 5th rows).

Performance Under Color Distortion:

Experiments evaluated the effect of color distortions on DGM performance by testing DGM framework 200 it on ImageNet-C. The ImageNet pretrained DGM model used for this experiment does not use any color augmentation during training, making it a sufficiently challenging task. The DGM ResNet-50 and GradCAM ResNet-50 visualization for two distortions is shown in FIG. 8 illustrating that DGM framework 200 captures the object shape very well under different challenging distortions like fog and blur. The GradCAM heatmap for the ResNet-50 is not very consistent across distortions as compared to DGM framework 200.

FIG. 10A depicts Table 7 at element 1001 providing DGM ResNet-50 1055 model results yield an improvement of 3.2 points on the corrupted images over standard ResNet-50 1050 model results, in accordance with aspects of the disclosure.

FIG. 10B depicts Table 8 at element 1002 providing semantic segmentation performance on PASCAL VOC 2012 and Cityscapes value datasets in terms of mean intersection over union (mIoU), in accordance with aspects of the disclosure.

For quantitative performance, the mean Corruption Error (mCE) metric was utilized, in which lower is better. DGM ResNet-50 1055 model was selected as it performs comparably to the standard ResNet-50 1050 model on clean images but with fewer parameters.

Semantic Image Segmentation:

DGM framework 200 was evaluated on the PASCAL VOC 2012 and Cityscapes semantic segmentation benchmark datasets utilizing a Level-5 DGM model with ResNet-50 (DGM ResNet-50 1055 model) as the image-feature pipeline pretrained on the ImageNet dataset. The number of parameters in the Level-5 DGM ResNet-50 1055 model was almost identical to the standard ResNet-50 model 1050 with approximately ~25M parameters each. Training hyperparameters were based on DeepLabv3+ models.

Effectiveness of DGM framework 200 was tested with two different segmentation heads 1096. First, with just two 1×1 convolutional layers as segmentation head 1096 that takes the final 2D features rescaled by factor of 4, and second, a DeepLabv3+ segmentation head 1096, which consists of atrous convolution with different rates to capture long range dependencies.

Atrous convolution, also known as dilated convolution, introduces a new dimension into deep learning by enabling networks to capture broader context without significantly increasing computational cost or parameters. Using a new parameter for dilation rate, unlike regular convolution which applies filters to adjacent pixels, atrous convolution spaces out the filter parameters by introducing gaps between them, controlled by the dilation rate. This process enlarges the receptive field of the filters without increasing the number of parameters. In simpler terms, it allows the network to capture a broader context from the input data without adding more complexity.

In Table 8 (FIG. 10B at element 1002), DGM ResNet-50 1055 model performs comparable to the standard DeepLabv3+ model, even with a very simple segmentation head 1096 on both datasets. This shows that geometric moments 241 are effective in capturing long range dependencies. DGM ResNet-50 1055 model shows improvements of 1.5% points on Pascal VOC and 0.7% points on Cityscapes value datasets compared to the standard ResNet model.

In such a way, a geometric moment-based deep learning model as implemented by DGM framework 200 is described which enables explicit capture of shape-related information in an end-to-end learnable fashion. DGM framework 200 improves the interpretability of features while also learning discriminative features. Quantitative and qualitative results on standard image classification and segmentation datasets show that DGM framework 200 performs better than the corresponding baseline and standard ResNet models. In addition, DGM framework 200 provides easy interpretability at different levels while also providing case of fine-tuning on a given dataset. Further, DGM framework 200 captures the shape of objects, even under extreme affine and color aberrations while performing better than existing approaches. Moreover, DGM framework 200 may outperform many other types of vision tasks, such as object detection and generation, and may be generalized to other modalities such as video, RGBD, and volumetric data.

Figure 11:
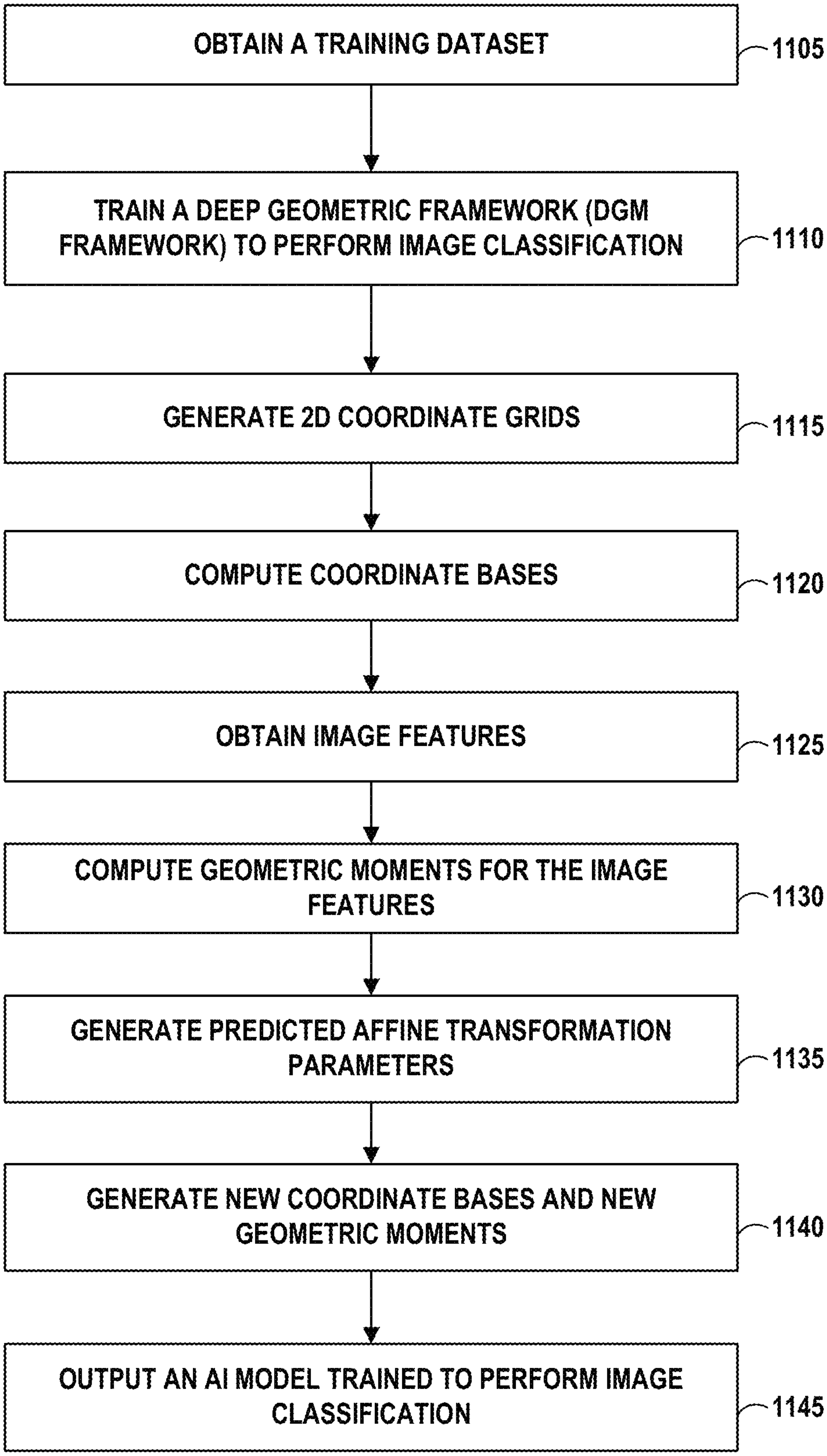
FIG. 11 is a flow chart illustrating an example mode of operation for a computing device to improve shape awareness and interpretability in deep networks using geometric moments, in accordance with aspects of the disclosure.

FIG. 11 is a flow chart illustrating an example mode of operation for computing device 100 to improve shape awareness and interpretability in deep networks using geometric moments, in accordance with aspects of the disclosure. The mode of operation is described with respect to computing device 100 and FIGS. 1-10.

Computing device 100 may obtain a training dataset (1105) by which to train an AI model. For instance, processing circuitry may execute a Deep Geometric Moment framework (DGM framework) to perform an image classification task, in which the DGM framework includes an image feature extraction pipeline and a coordinate bases computation pipeline. Computing device 100 may obtain, using the DGM framework, the training dataset having a plurality of images.

Computing device 100 may train the DGM to perform image classification (1110). For example, processing circuitry 199 of computing device 100 may train the DGM framework to perform the image classification task (1110). For example, processing circuitry 199 of computing device 100 may train the DGM framework to perform the image classification task by performing training operations.

Computing device 100 may generate 2D coordinate grids (1115). For example, processing circuitry 199 of computing device 100 may generate, using the coordinate bases computation pipeline, 2D coordinate grids for the plurality of images.

Computing device 100 may compute coordinate bases (1120). For example, processing circuitry 199 of computing device 100 may compute, using the coordinate bases computation pipeline, coordinate bases for the plurality of images using the 2D coordinate bases as input.

Computing device 100 may obtain image features (1125). For example, processing circuitry 199 of computing device 100 may obtain, using a Residual Network (ResNet) convolutional block of the image feature extraction pipeline, image features for the plurality of images.

Computing device 100 may compute geometric moments for the image features (1130). For example, processing circuitry 199 of computing device 100 may compute, using the DGM framework, geometric moments for the image features of the plurality of images using the 2D coordinate bases as input.

Computing device 100 may generate predicted affine transformation parameters (1135). For example, processing circuitry 199 of computing device 100 may generate predicted affine transformation parameters for the image features to transform the 2D coordinate bases into a transformed coordinate grid using the image features and the geometric moments for the plurality of images.

Computing device 100 may generate new coordinate bases and new geometric moments (1140). For example, processing circuitry 199 of computing device 100 may generate new coordinate bases and new geometric moments learned from the image features to reconstruct the plurality of images using the transformed coordinate grid.

Computing device 100 may output an AI model trained to perform image classification (1145). For example, processing circuitry 199 of computing device 100 may output, by the processing circuitry using the DGM framework, an Artificial Intelligence model (AI model) trained to perform the image classification task for an input image.

According to another example, computing device 100 may execute, using the DGM framework, the AI model having a plurality of convolutional networks trained on the training dataset without pooling layers within any of the plurality of convolutional networks.

According to another example of computing device 100, the AI model is trained without reduction of spatial dimensions of the plurality of images across the plurality of convolutional networks.

According to another example, computing device 100 may train, using the DGM framework, the AI model end-to-end through one or more ResNet convolutional blocks without any pooling layer or reduction in spatial dimensions across the one or more ResNet convolutional blocks to preserve shapes of objects detected within the plurality of images.

According to another example, computing device 100 may obtain an input image not represented within the training dataset.

According to another example, computing device 100 may output, using the AI model trained to perform the image classification task for the input image, class probabilities generated specific to the input image for the image classification task.

According to another example, computing device 100 may obtain an input image not represented within the training dataset.

According to another example, computing device 100 may output, using the AI model trained to perform the image classification task for the input image, a reconstructed visualization with highlights superimposed onto a derived shape of an object within the input image using learned image features extracted from the input image by the AI model.

According to another example, computing device 100 may generate, using the coordinate bases computation pipeline, the 2D coordinate grids for the plurality of images, wherein each one of the plurality of images is represented by a term 2×N×N, where N×N is a dimension of a respective one of the plurality of images.

According to another example of computing device 100, the entries in the 2D coordinate grids indicate normalized 2D pixel locations.

According to another example of computing device 100, the 2D coordinate bases are each of the dimension C×N×N, where C represents a quantity of the geometric moments for a respective one of the plurality of images.

According to another example, computing device 100 may increase depth within a deep network of the AI model by repeating geometric moment Level-2 operations a configurable number of times, in which each iteration of the geometric moment Level-2 operations include the processing circuitry to: compute the geometric moments for the image features of the plurality of images using the 2D coordinate bases as input; generate the predicted affine transformation parameters for the image features to transform the 2D coordinate bases into the transformed coordinate grid using the image features and the geometric moments for the plurality of images; and generate the new coordinate bases and the new geometric moments learned from the image features to reconstruct the plurality of images using the transformed coordinate grid.

According to another example, computing device 100 may input into a fully-connected layer of the AI model, the geometric moments learned from the image features in a final iteration of the geometric moment Level-2 operations to generate class probabilities to perform the image classification task.

According to another example, computing device 100 may compute, using the DGM framework, the geometric moments by projecting the image features of the plurality of images onto the 2D coordinate bases.

For processes, apparatuses, and other examples or illustrations described herein, including in any flowcharts or flow diagrams, certain operations, acts, steps, or events included in any of the techniques described herein may be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with the examples of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. A computer program product may include a computer-readable medium.

By way of example, and not limitation, such computer-readable storage media may include RAM, ROM, EEPROM, CD-ROM or other optical disk storage, magnetic disk storage, or other magnetic storage devices, flash memory, or any other medium that may be used to store desired program code in the form of instructions or data structures and that may be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structures or any other structure suitable for implementation of the techniques described. In addition, in some examples, the functionality described may be provided within dedicated hardware and/or software modules. Also, the techniques could be fully implemented in one or more circuits or logic elements.

What is claimed is:

1. A system comprising:

processing circuitry; and non-transitory computer readable media storing instructions that, when executed by the processing circuitry, configure the processing circuitry to:

execute, by the processing circuitry, a Deep Geometric Moment framework (DGM framework) to perform an image classification task, the DGM framework having an image feature extraction pipeline and a coordinate bases computation pipeline;

obtain, by the processing circuitry using the DGM framework, a training dataset having a plurality of images;

train, by the processing circuitry, the DGM framework to perform the image classification task by operations which include the processing circuitry to:

generate, by the processing circuitry using the coordinate bases computation pipeline, 2D coordinate grids for the plurality of images;

compute, by the processing circuitry using the coordinate bases computation pipeline, coordinate bases for the plurality of images using the 2D coordinate grids;

obtain, by the processing circuitry using a Residual Network (ResNet) convolutional block of the image feature extraction pipeline, image features for the plurality of images;

compute, by the processing circuitry using the DGM framework, geometric moments for the image features of the plurality of images using the 2D coordinate grids;

generate, by the processing circuitry, predicted affine transformation parameters for the image features to transform the 2D coordinate grids into transformed coordinate grids using the image features and the geometric moments for the plurality of images;

generate, by the processing circuitry, new coordinate bases and new geometric moments learned from the image features to reconstruct the plurality of images using the transformed coordinate grid; and output, by the processing circuitry using the DGM framework, an Artificial Intelligence model (AI model) trained to perform the image classification task for an input image; and execute, by the processing circuitry using the DGM framework, the AI model having a plurality of convolutional networks trained on the training dataset without pooling layers within any of the plurality of convolutional networks, wherein the AI model is trained without reduction of spatial dimensions of the plurality of images across the plurality of convolutional networks.

2. The system of claim 1, wherein the processing circuitry is further configured to:

fine-tune the AI model for a target dataset by updating parameters of the coordinate bases computation pipeline while freezing parameters of the image feature extraction pipeline.

3. The system of claim 1, wherein the processing circuitry is further configured to:

train, by the processing circuitry using the DGM framework, the AI model end-to-end through one or more ResNet convolutional blocks without any pooling layer or reduction in spatial dimensions across the one or more ResNet convolutional blocks to preserve shapes of objects detected within the plurality of images.

4. The system of claim 1, wherein the processing circuitry is further configured to:

obtain, by the processing circuitry, the input image not represented within the training dataset; and output, by the processing circuitry using the AI model trained to perform the image classification task for the input image, class probabilities generated specific to the input image for the image classification task.

5. The system of claim 1, wherein the processing circuitry is further configured to:

obtain, by the processing circuitry, the input image not represented within the training dataset; and output, by the processing circuitry using the AI model trained to perform the image classification task for the input image, a reconstructed visualization with highlights superimposed onto a derived shape of an object within the input image using learned image features extracted from the input image by the AI model.

6. The system of claim 1, wherein the processing circuitry is further configured to:

generate, by the processing circuitry using the coordinate bases computation pipeline, the 2D coordinate grids for the plurality of images, wherein each 2D coordinate grid has dimensions 2×N×N, where N×N refers to a height and width of a respective one of the plurality of images; and wherein entries in the 2D coordinate grids indicate normalized 2D pixel locations.

7. The system of claim 6:

wherein the 2D coordinate grids are of a dimension C×N×N, where C represents a quantity of the geometric moments for a respective one of the plurality of images.

8. The system of claim 1, wherein the processing circuitry is further configured to:

increase depth within a deep network of the AI model by repeating geometric moment Level-2 operations a configurable number of times, wherein each iteration of the geometric moment Level-2 operations include the processing circuitry to:

compute the geometric moments for the image features of the plurality of images using the 2D coordinate grids;

generate the predicted affine transformation parameters for the image features to transform the 2D coordinate grids into the transformed coordinate grid using the image features and the geometric moments for the plurality of images; and generate the new coordinate bases and the new geometric moments learned from the image features to reconstruct the plurality of images using the transformed coordinate grid; and input into a fully-connected layer of the AI model, the geometric moments learned from the image features in a final iteration of the geometric moment Level-2 operations to generate class probabilities to perform the image classification task.

9. The system of claim 1, wherein the processing circuitry is further configured to:

compute, by the processing circuitry using the DGM framework, the geometric moments by projecting the image features of the plurality of images onto the 2D coordinate grids.

10. A method comprising:

executing, by one or more processors of a computing device, a Deep Geometric Moment framework (DGM framework) to perform an image classification task, the DGM framework having an image feature extraction pipeline and a coordinate bases computation pipeline;

obtaining, by the one or more processors using the DGM framework, a training dataset having a plurality of images;

training, by the one or more processors, the DGM framework to perform the image classification task by operations including:

generating, by the one or more processors using the coordinate bases computation pipeline, 2D coordinate grids for the plurality of images;

computing, by the one or more processors using the coordinate bases computation pipeline, coordinate bases for the plurality of images using the 2D coordinate grids;

obtaining, by the one or more processors using a Residual Network (ResNet) convolutional block of the image feature extraction pipeline, image features for the plurality of images;

computing, by the one or more processors using the DGM framework, geometric moments for the image features of the plurality of images using the 2D coordinate grids;

generating, by the one or more processors, predicted affine transformation parameters for the image features to transform the 2D coordinate grids into transformed coordinate grids using the image features and the geometric moments for the plurality of images; and generating, by the one or more processors, new coordinate bases and new geometric moments learned from the image features to reconstruct the plurality of images using the transformed coordinate grid;

outputting, by the one or more processors using the DGM framework, an Artificial Intelligence model (AI model) trained to perform the image classification task for an input image; and executing, by the one or more processors using the DGM framework, the AI model having a plurality of convolutional networks trained on the training dataset without pooling layers within any of the plurality of convolutional networks, wherein the AI model is trained without reduction of spatial dimensions of the plurality of images across the plurality of convolutional networks.

11. The method of claim 10, further comprising:

fine-tuning, by the one or more processors, the AI model for a target dataset by updating parameters of the coordinate bases computation pipeline while freezing parameters of the image feature extraction pipeline.

12. The method of claim 10, further comprising:

training, by the one or more processors using the DGM framework, the AI model end-to-end through one or more ResNet convolutional blocks without any pooling layer or reduction in spatial dimensions across the one or more ResNet convolutional blocks to preserve shapes of objects detected within the plurality of images.

13. The method of claim 10, further comprising:

obtaining, by the one or more processors, the input image not represented within the training dataset; and outputting, by the one or more processors using the AI model trained to perform the image classification task for the input image, class probabilities generated specific to the input image for the image classification task.

14. The method of claim 10, further comprising:

obtaining, by the one or more processors, the input image not represented within the training dataset; and outputting, by the one or more processors using the AI model trained to perform the image classification task for the input image, a reconstructed visualization with highlights superimposed onto a derived shape of an object within the input image using learned image features extracted from the input image by the AI model.

15. The method of claim 10, further comprising:

generating, by the one or more processors using the coordinate bases computation pipeline, the 2D coordinate grids for the plurality of images, wherein each 2D coordinate grid has dimensions 2×N×N, where N×N refers to a height and width of a respective one of the plurality of images;

wherein entries in the 2D coordinate grids indicate normalized 2D pixel locations; and wherein the 2D coordinate grids are each of a dimension C×N×N, where C represents a quantity of the geometric moments for a respective one of the plurality of images.

16. Computer-readable storage media comprising instructions that, when executed, configure processing circuitry to:

execute a Deep Geometric Moment framework (DGM framework) to perform an image classification task, the DGM framework having an image feature extraction pipeline and a coordinate bases computation pipeline;

obtain, using the DGM framework, a training dataset having a plurality of images;

train the DGM framework to perform the image classification task by operations which include the processing circuitry to:

generate, using the coordinate bases computation pipeline, 2D coordinate grids for the plurality of images;

compute, using the coordinate bases computation pipeline, coordinate bases for the plurality of images using the 2D coordinate grids;

obtain, using a Residual Network (ResNet) convolutional block of the image feature extraction pipeline, image features for the plurality of images;

compute, using the DGM framework, geometric moments for the image features of the plurality of images using the 2D coordinate grids;

generate, predicted affine transformation parameters for the image features to transform the 2D coordinate grids into transformed coordinate grids using the image features and the geometric moments for the plurality of images; and generate, new coordinate bases and new geometric moments learned from the image features to reconstruct the plurality of images using the transformed coordinate grid;

output, using the DGM framework, an Artificial Intelligence model (AI model) trained to perform the image classification task for an input image; and execute, using the DGM framework, the AI model having a plurality of convolutional networks trained on the training dataset without pooling layers within any of the plurality of convolutional networks, wherein the AI model is trained without reduction of spatial dimensions of the plurality of images across the plurality of convolutional networks.

17. The computer-readable storage media comprising of claim 16, wherein the processing circuitry is further configured to:

fine-tune the AI model for a target dataset by updating parameters of the coordinate bases computation pipeline while freezing parameters of the image feature extraction pipeline.

18. The computer-readable storage media comprising of claim 16, wherein the processing circuitry is further configured to:

train, using the DGM framework, the AI model end-to-end through one or more ResNet convolutional blocks without any pooling layer or reduction in spatial dimensions across the one or more ResNet convolutional blocks to preserve shapes of objects detected within the plurality of images.

19. The computer-readable storage media comprising of claim 16, wherein the processing circuitry is further configured to:

obtain the input image not represented within the training dataset; and output, using the AI model trained to perform the image classification task for the input image, class probabilities generated specific to the input image for the image classification task.

20. The computer-readable storage media comprising of claim 16, wherein the processing circuitry is further configured to:

generate, using the coordinate bases computation pipeline, the 2D coordinate grids for the plurality of images, wherein each 2D coordinate grid has dimensions 2×N×N, where N×N refers to a height and width of a respective one of the plurality of images;

wherein entries in the 2D coordinate grids indicate normalized 2D pixel locations; and wherein the 2D coordinate grids are each of a dimension C×N×N, where C represents a quantity of the geometric moments for a respective one of the plurality of images.

* * * * *